(12) United States Patent
Tokiwa et al.

(10) Patent No.: US 7,519,291 B2
(45) Date of Patent: Apr. 14, 2009

(54) DIGITAL CAMERA, LENS UNIT, AND CAMERA SYSTEM HAVING THE SAME

(75) Inventors: Kentaro Tokiwa, Saitama (JP); Hiroshi Tanaka, Saitama (JP); Takehiko Senba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 444 days.

(21) Appl. No.: 11/384,390

(22) Filed: Mar. 21, 2006

(65) Prior Publication Data
US 2006/0216023 A1 Sep. 28, 2006

(30) Foreign Application Priority Data
Mar. 24, 2005 (JP) ............... 2005-087114
Mar. 29, 2005 (JP) ............... 2005-095632

(51) Int. Cl.
*G03B 17/14* (2006.01)
*G02B 7/14* (2006.01)

(52) U.S. Cl. .............. 396/532; 396/542; 359/819; 359/827; 359/828

(58) Field of Classification Search ......... 396/529–533, 396/542; 359/819, 827–828, 830
See application file for complete search history.

(56) References Cited

U.S. PATENT DOCUMENTS 6,462,895 B2 * 10/2002 Hunter ................ 359/819
6,483,101 B1 * 11/2002 Webster ................ 250/216
6,845,218 B2    1/2005 Miyasaka et al.

FOREIGN PATENT DOCUMENTS

| JP | 11-169347 A | 6/1999 |
| JP | 2001-116972 A | 4/2001 |
| JP | 2003-302563 A | 10/2003 |
| JP | 2004-341265 A | 12/2004 |

* cited by examiner

*Primary Examiner*—Bot LeDynh
(74) *Attorney, Agent, or Firm*—Sughrue Mion, PLLC

(57) ABSTRACT

A digital still camera includes a lens unit and a camera body. The lens unit has a photographing lens, and a CCD for image pickup by detecting object light from the photographing lens. The camera body has a lens mount portion adapted to loading of the lens unit, and a camera contact for electrical connection with the lens unit. The lens unit has a lens unit coupling portion, engageable with the lens mount portion, for removable loading on the camera body. A lens connection contact touches the camera contact when the lens mount portion is engaged with the lens unit coupling portion, for electrical connection. A circuit board is connected with the CCD, has a first surface opposed to the camera body. The lens connection contact is mounted on the first surface. In preferred embodiment, a bayonet mechanism couples the lens unit coupling portion with the lens mount portion.

12 Claims, 20 Drawing Sheets

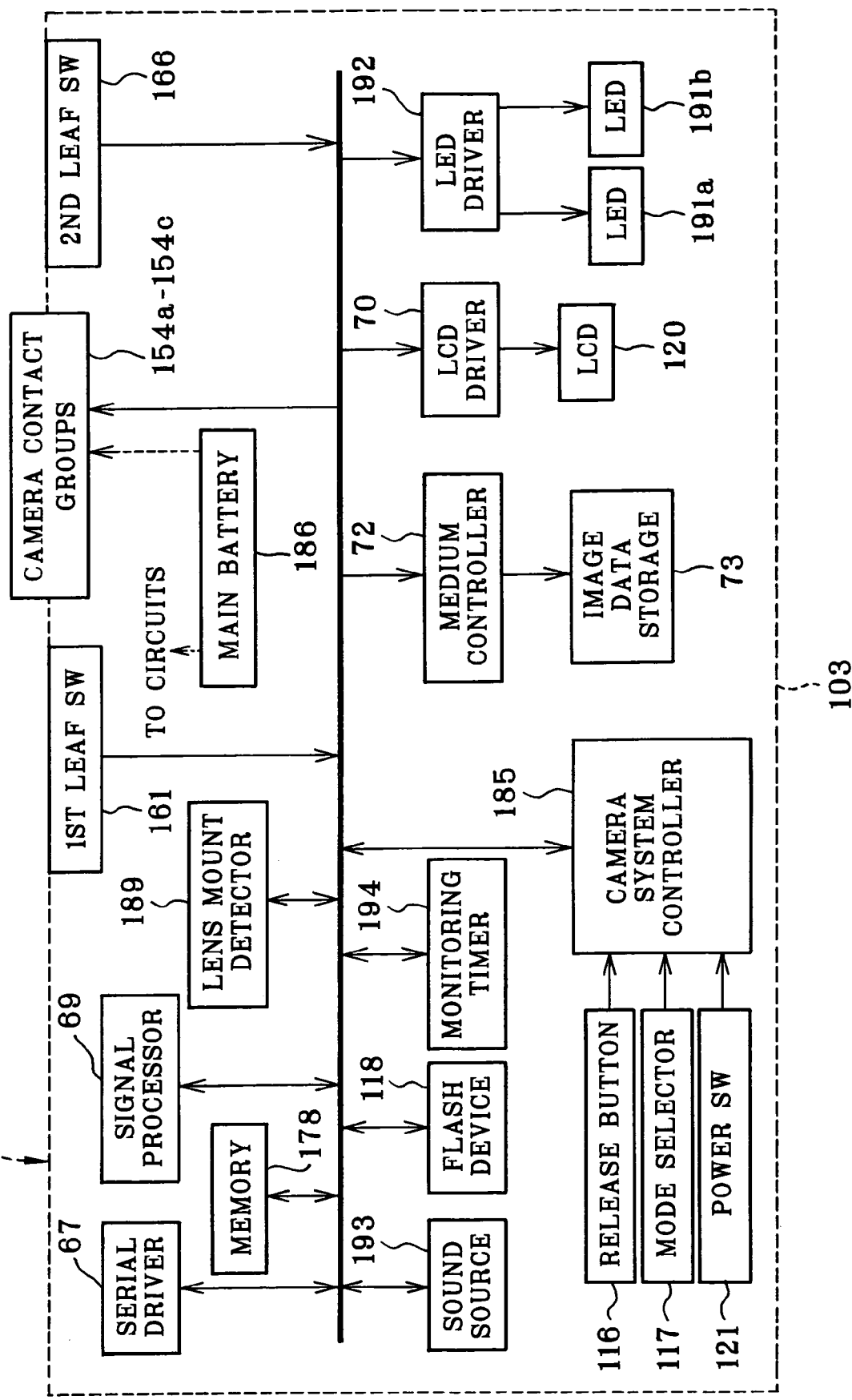

DIGITAL CAMERA, LENS UNIT, AND CAMERA SYSTEM HAVING THE SAME

This application claims foreign priority based on Japanese Patent Applications No. 2005-087114, filed Mar. 24, 2005, and No. 2005-095632, filed Mar. 29, 2005, the contents of which are incorporated herein by reference in their entirety.

BACKGROUND OF THE INVENTION

1. Field of the Invention

The present invention relates to a digital camera, lens unit, and camera system having the same. More particularly, the present invention relates to a digital camera, lens unit, and camera system having the same, which is suitable in view of reliable transmission of image signals by appropriately constructing contacts for electrical connection in an interchangeable unit for use with a camera body.

2. Description Related to the Prior Art

A digital still camera is widely used, and includes an image pickup device or CCD for photographing an image to store the image to a data storage, such as an internal memory, memory card or the like. Various cameras are known, including a unified type in which a camera body includes a photographing lens, and a lens interchangeable type in which the photographing lens is removably mounted on the camera body.

JP-A 2001-116972 discloses a conventional construction of a lens interchangeable type of the digital still camera, in which parts in a camera for with silver halide photo films are utilized without structural changes. The image pickup device or CCD is incorporated in the camera body in place of a photo film, to pick up and record an image by use of a storage. An interchangeable lens for the digital still camera is basically the same as that for a photographic camera.

Owing to technical development in the field of imaging, the image pickup device or CCD comes to have a gradually smaller size than before, and a greater number of pixels. It is conceivable regarding the digital still camera that the CCD is contained in the interchangeable lens as a renewed structure of a lens changeable product, which is in place of utilizing easily available structures of cameras for use with silver halide photo films. According to the conception, no optical connection is required between the interchangeable lens and the camera body. The interchangeable lens can be connected with the camera body only electrically. This is advantageous in possibility of simplifying the structure.

In a system with the interchangeable lens, a lens unit is combined with the camera body of the digital still camera. It is necessary to transmit control signals and supply power from the camera body to the lens unit. To this end, the lens unit is provided with lens connection contacts for use with camera contacts which the camera body includes. When the lens unit is set on the camera body, those are electrically interconnected by the touch between the lens connection contacts and the camera contacts.

So far, flexible wiring boards have been widely used for connection between a circuit board in the lens unit and the lens connection contacts. However, several attempts are made for saving a mechanical space inside the lens unit because of high density in mounting of relevant parts. For example, JP-A 2001-116972 discloses arrangement of the lens connection contacts, which includes the circuit board, the lens connection contacts and wiring. The circuit board for lens control is secured to the inside of the lens unit. The lens connection contacts are secured to a rear end of a lens mount. The wiring connects the lens connection contacts to the circuit board electrically. An opening is formed in the circuit board for coming the lines from the lens connection contacts. Ends of the lines of the lens connection contacts extending through the opening are connected with the wiring, so that a space for the wiring can be saved. JP-A 2003-302563 discloses arrangement of the lens connection contacts, which includes plural pins of the lens connection contacts, a flexible wiring board as the circuit board, and a supporting body secured on the lens mount for supporting the pins and the flexible wiring board. The pins of the lens connection contacts are constituted by compressed springs compressed in a radial direction of the lens mount. Also, there is a digital still camera α 3700i (trade name) manufactured and sold by Minolta Corporation. This includes the circuit board of a rigid form and having a plurality of the lens connection contacts mounted thereon. The circuit board is secured to the rear end of the lens mount. A part mounted circuit board or camera circuit board is connected to the circuit board by wiring of the flexible wiring board.

It is however impossible to save an internal mechanical space according to the structures of JP-A 2001-116972 and JP-A 2003-302563 and the digital still camera α 3700i (trade name). In the digital still camera of JP-A 2001-116972 and JP-A 2003-302563, the lens connection contacts for use with the camera contacts has a shortcoming in the considerable large number of the parts of the lens unit, because one member or part of contact is required for each of the lens connection contacts. According to the digital still camera α 3700i (trade name), the image pickup device or CCD extends between the circuit board and the part mounted circuit board or camera circuit board. A value of impedance of the flexible wiring board creates a low level of a communication speed as a bottle neck despite requirement of a high speed of the communication speed in connection with the part mounted circuit board or camera circuit board. The disposition of the CCD in the lens unit further raises the density of mounting the parts. Data must be transmitted to the camera body at a high level of the communication speed. It is extremely difficult to reduce a space in the lens unit in the case of the lens connection contacts and the camera contacts of the above. No sufficient highness of the communication speed can be obtained in connection with the camera body.

Also, U.S. Pat. No. 6,845,218 (corresponding to JP-A 2004-361898), JP-A 11-169347 and JP-A 2004-341265 disclose known cameras having the interchangeable lens and capable of detecting a loaded state of the interchangeable lens. However, it is still impossible to detect an incompletely loaded state. In the retention for use with bayonet lugs, it is likely that the interchangeable lens may not be rotated, or may be rotated only at a point short of the rotational position for the fully loaded state. A problem arises that a user will not be aware of the incomplete of the interchangeable lens. Image pickup cannot be made. Also, he or she erroneously determines occurrence of failure because of lack of image signals transmitted to the camera body. In particular, the problem is serious for a system with the interchangeable lens containing the image pickup device or CCD. No image data will be sent to the camera body if no setting in the fully loaded state is ensured, because the lens connection contacts and the camera contacts must interconnect for data transmission from the CCD to the camera body.

SUMMARY OF THE INVENTION

In view of the foregoing problems, an object of the present invention is to provide a digital camera, lens unit, and camera system having the same, which is suitable in view of reliable transmission of image signals by appropriately constructing contacts for electrical connection in an interchangeable unit for use with a camera body.

In order to achieve the above and other objects and advantages of this invention, a digital camera includes a lens unit and a camera body, the lens unit having a photographing lens, and an image pickup device for image pickup by detecting object light from the photographing lens, the camera body having a lens mount portion adapted to loading of the lens unit, and a camera contact for electrical connection with the lens unit. In the digital camera, the lens unit has a lens unit coupling portion, engageable with the lens mount portion, for removable loading on the camera body. A lens connection contact touches the camera contact when the lens mount portion is engaged with the lens unit coupling portion, for electrical connection. A circuit board is connected with the image pickup device, has a first surface opposed to the camera body, wherein the lens connection contact is mounted on the first surface.

The circuit board is disposed at a rear end of the lens unit.

The lens unit coupling portion is engaged with the lens mount portion by bayonet coupling.

The first surface is directed backwards, and a second surface of the circuit board is directed forwards, and the image pickup device is disposed on the second surface.

Furthermore, an image pickup circuit board is provided with the image pickup device mounted thereon, and connected with the circuit board.

The circuit board includes a communication processor for transmitting information generated by the image pickup device to the camera body.

The lens connection contact is constituted by plural lens connection contacts, arranged near to one another in a rotational direction of the lens unit coupling portion, and included in a contact block. The circuit board has a plurality of the contact block.

The lens unit coupling portion includes a protecting ridge, disposed about a position of the lens connection contact, for protecting the lens connection contact by protruding backwards therefrom.

The lens mount portion has a receptacle opening for receiving insertion of the lens unit coupling portion. A first bayonet lug mechanism is disposed on an open end of the receptacle opening, for projecting toward a central axis thereof. The lens unit coupling portion has a second bayonet lug mechanism, disposed to project radially, inserted in a retaining channel defined in a middle of the first bayonet lug mechanism, for rotationally shifting relative to the first bayonet lug mechanism after insertion, to retain the lens unit on the camera body.

One of the camera contact and the lens connection contact is disposed to project from a retaining channel defined in a middle of the first bayonet lug mechanism. A remaining one of the camera contact and the lens connection contact is overlaid on a first surface of the second bayonet lug mechanism disposed opposite to the first bayonet lug mechanism.

The circuit board includes an image pickup device driver for driving the image pickup device.

The digital camera is a digital still camera.

Preferably, a lens unit is provided, and is loadable on a camera body having a lens mount portion and a camera contact. There is a lens barrel for mounting a photographic lens. An image pickup device operates for image pickup by detecting object light from the photographing lens. A lens unit coupling portion is formed on the lens barrel, engageable with the lens mount portion, for removable loading on the camera body. A lens connection contact is located on the lens barrel, for touching the camera contact when the lens mount portion is engaged with the lens unit coupling portion, for electrical connection. A circuit board is contained in the lens barrel, connected with the image pickup device, having a first surface opposed to the camera body, wherein the lens connection contact is mounted on the first surface.

According to one aspect of the invention, a camera system is provided, including a camera body for loading in a removable manner with an interchangeable unit selected from plural interchangeable units including a lens unit. A detector detects completion of loading of the interchangeable unit. A signal generator is positioned on the camera body, for notifying state information of the completion of the loading by generating a signal upon detection of the detector.

Preferably, a camera system includes a camera body for loading in a removable manner with an interchangeable unit selected from plural interchangeable units including a lens unit. A first detector detects a start of loading of the interchangeable unit. A second detector detects completion of the loading of the interchangeable unit. A timer measures time elapsed after the first detector detects the start of the loading. A partial loading signal generator is positioned on the camera body, for, after detection of the start of the loading in the first detector, monitoring the second detector for detection of the completion of the loading, and for, in case of lack of detection of the completion of the loading in the second detector upon lapse of a predetermined time after the start of measurement in the timer, notifying state information of an incomplete state of the loading of the interchangeable unit.

The camera body further includes a loading completion signal generator for notifying state information of the completion of the loading by generating a signal upon detection of the second detector within the predetermined time after the start of measurement in the timer.

The interchangeable unit is coupled with the camera body by bayonet coupling.

Furthermore, a receptacle opening is formed in one of the camera body and the interchangeable unit. A coupling portion is positioned on a remaining one of the camera body and the interchangeable unit, and insertable in the receptacle opening. A first bayonet lug mechanism is disposed on an open end of the receptacle opening, for projecting toward a central axis thereof. A second bayonet lug mechanism is disposed to project radially from the coupling portion, inserted in a retaining channel defined in a middle of the first bayonet lug mechanism, for rotationally shifting relative to the first bayonet lug mechanism after insertion, to retain the interchangeable unit on the camera body.

The receptacle opening is formed in the camera body, and the coupling portion is disposed on the interchangeable unit.

Furthermore, a partial loading signal generator includes an indicating light source for illuminating to indicate the state information.

The receptacle opening is located on a first region of the camera body, and the indicating light source is located on a second region of the camera body disposed on an extension of the first region.

The partial loading signal generator includes an image display panel.

The image display panel is disposed on a surface of the camera body directed opposite to a surface where the receptacle opening is disposed.

The interchangeable unit further includes an interchangeable unit coupling portion for loading on the camera body removably by engagement therewith. The first detector includes a first detection switch for generating a detection signal when the interchangeable unit coupling portion contacts the camera body. The second detector includes a second detection switch for generating a detection signal when the interchangeable unit is rotated relative to the camera body at a predetermined angle from a contacting state between the interchangeable unit coupling portion and the camera body.

The first detector includes an engageable shifter, disposed on one of the camera body and the interchangeable unit coupling portion, for shifting upon being pressed by coupling of the camera body and the interchangeable unit coupling portion, in order to change over the first detection switch.

The second detector includes a shifter, disposed on a selected one of the camera body and the interchangeable unit coupling portion, for extending toward the second detection switch. A biasing structure biases the shifter in a direction to project from the selected one. An engageable notch is formed in a remaining one of the camera body and the interchangeable unit coupling portion, for receiving the shifter to shift when the interchangeable unit coupling portion is rotated relative to the camera body at the predetermined angle, in order to change over the second detection switch.

The camera contact is constituted by first to Nth camera contacts arranged in one train, and the first to (N−1)th camera contacts are arranged at a predetermined pitch.

Furthermore, a camera contact is located on the camera body. An image pickup device is incorporated in the lens unit. A lens connection contact is located on the lens unit, for touching the camera contact when the receptacle opening is engaged with the lens unit, for transmitting information generated by the image pickup device.

BRIEF DESCRIPTION OF THE DRAWINGS

The above objects and advantages of the present invention will become more apparent from the following detailed description when read in connection with the accompanying drawings, in which:

FIG. 24B is a block diagram schematically illustrating arrangement of circuits of the camera body.

DETAILED DESCRIPTION OF THE PREFERRED EMBODIMENT(S) OF THE PRESENT INVENTION

Figure 1:
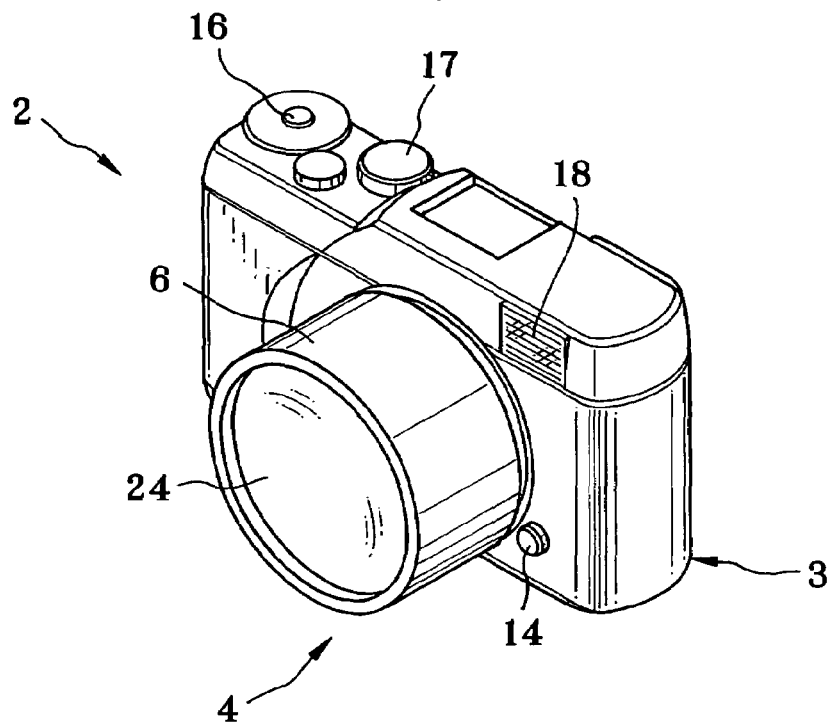
FIG. 1 is a perspective view illustrating a digital still camera in which a lens unit is loaded.
Figure 2:
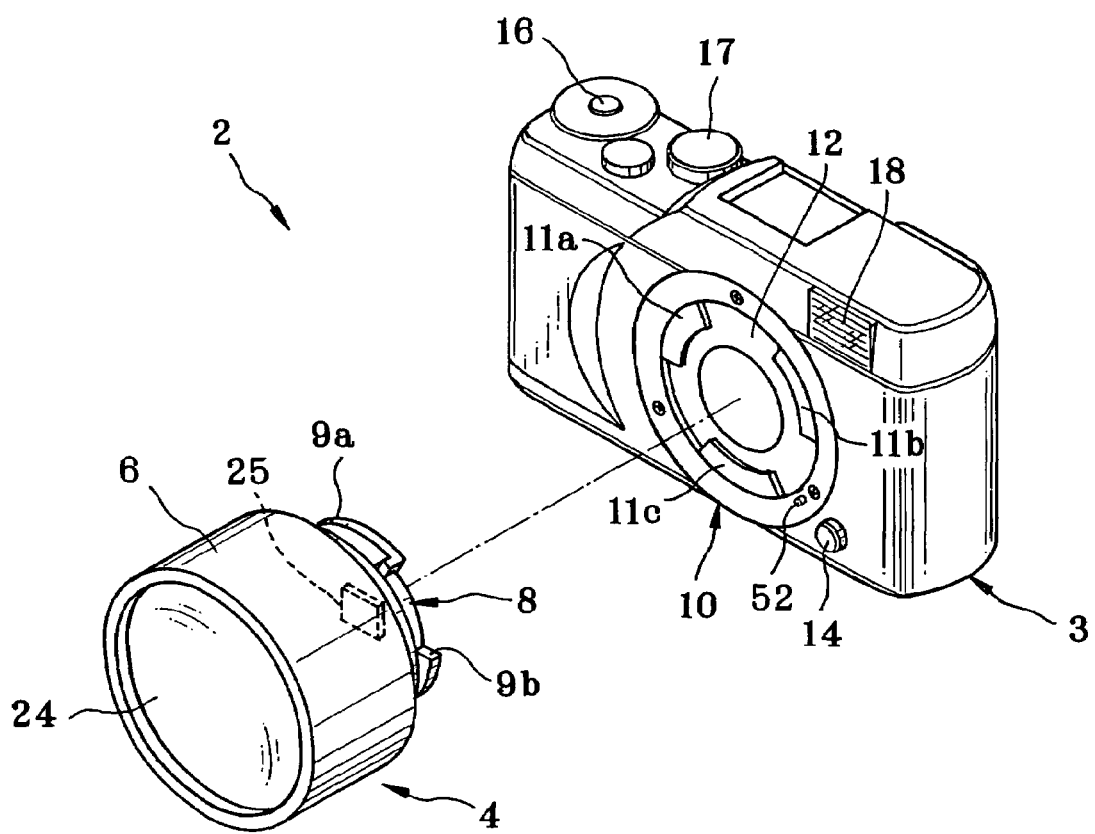
FIG. 2 is a perspective view illustrating the digital still camera from which the lens unit is removed.

A digital still camera 2 of the invention is described hereinafter by referring to the drawings. In FIGS. 1 and 2, the digital still camera 2 includes a camera body or camera main unit 3 and a lens unit 4. The lens unit 4 is set on the camera body 3 in a removable manner, and when set suitably, is electrically connected with the camera body 3. In FIG. 1, the camera body 3 and the lens unit 4 in a loaded state on the camera body 3 are depicted. In FIG. 2, the camera body 3 and the lens unit 4 in a removed state are depicted.

Figure 3:
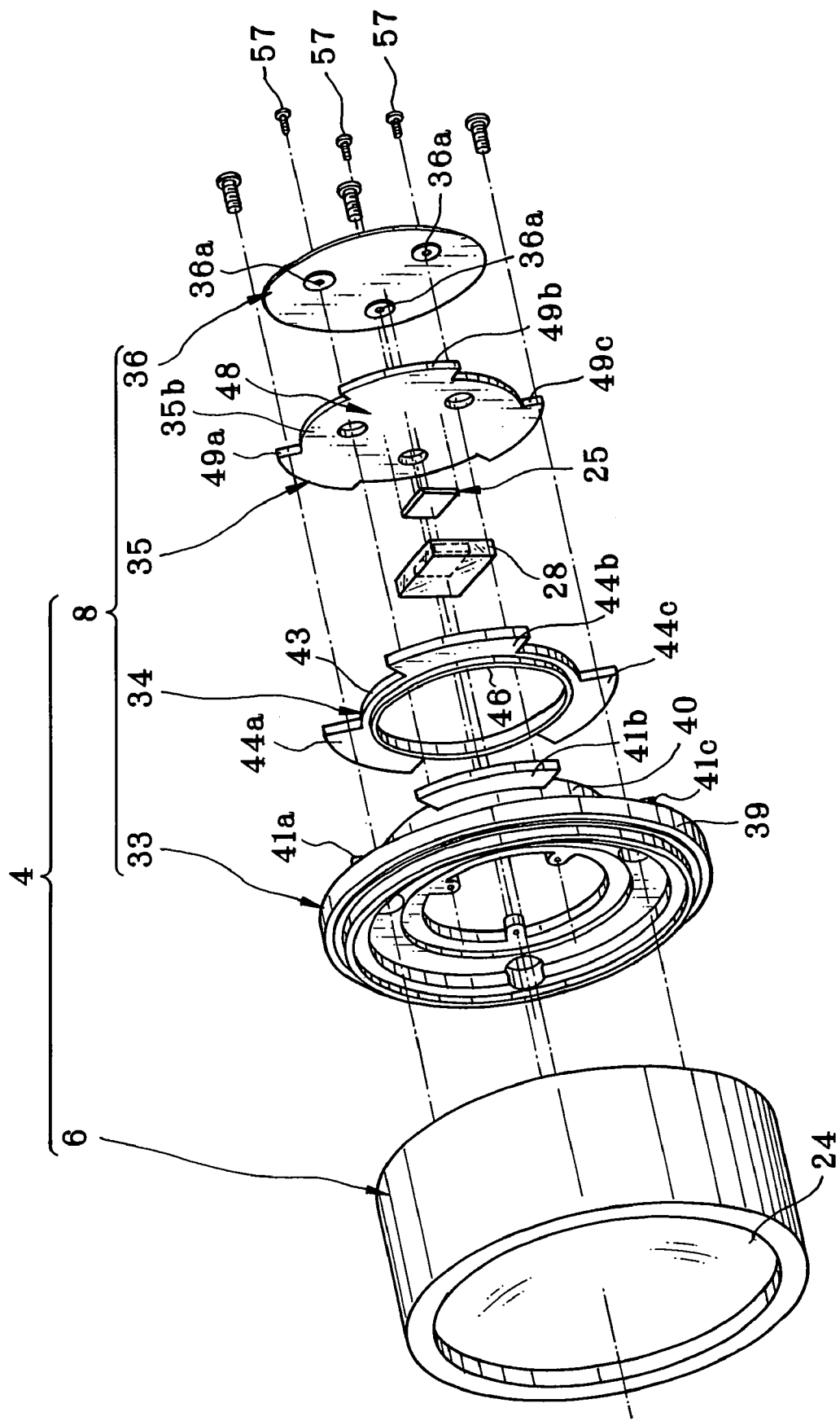
FIG. 3 is an exploded perspective view illustrating the lens unit.

A lens unit coupling mechanism 8 for mounting is located at the rear end of the lens unit 4. Bayonet lugs 9a, 9b and 9c are included in the lens unit coupling mechanism 8 and protrude as illustrated in FIG. 3. A lens mount mechanism 10 is located on the camera body 3, together with a front panel, a receptacle opening, and a barrel coupling bayonet ring. Bayonet lugs 11a, 11b and 11c are included in the lens mount mechanism 10, and project from the lens mount mechanism 10 in association with the bayonet lugs 9a-9c. The bayonet lugs 9a-9c are coupled with the bayonet lugs 11a-11c in a meshed manner to retain the lens unit 4 on the camera body 3. A protecting lid 12 is contained inside the lens mount mechanism 10. See FIG. 5. A compression coil spring 13 biases the protecting lid 12 in a forward direction, so as to prevent dust or the like from entry to the camera body 3 while the lens unit 4 is not yet loaded.

An unlocking button 14 is located near to the lens mount mechanism 10. To remove the lens unit 4, the unlocking button 14 is depressed manually. A locking pin or shifter 52 with a pinhead to be described later is moved backwards for unlocking when the unlocking button 14 is depressed.

A release button 16 or recording button and a mode selector 17 are disposed on an upper surface of the camera body 3. The release button 16 is depressible for recording an image. The mode selector 17 is operated for setting a selected one of the modes. An electronic flash device 18 is disposed on a front surface of the camera body 3. An image display panel or LCD 20 (See FIG. 9) and a power switch 21 (See FIG. 9) are disposed on a rear face of the camera body 3. The LCD 20 displays an image being picked up, and information of various items of conditions for the pickup.

In FIG. 2, a lens barrel 6 is a main element of the lens unit 4, and is provided with the lens unit coupling mechanism 8. A photographing lens 24 is incorporated in the lens barrel 6. A CCD 25 as image pickup device is contained inside the lens unit coupling mechanism 8.

Figure 4:
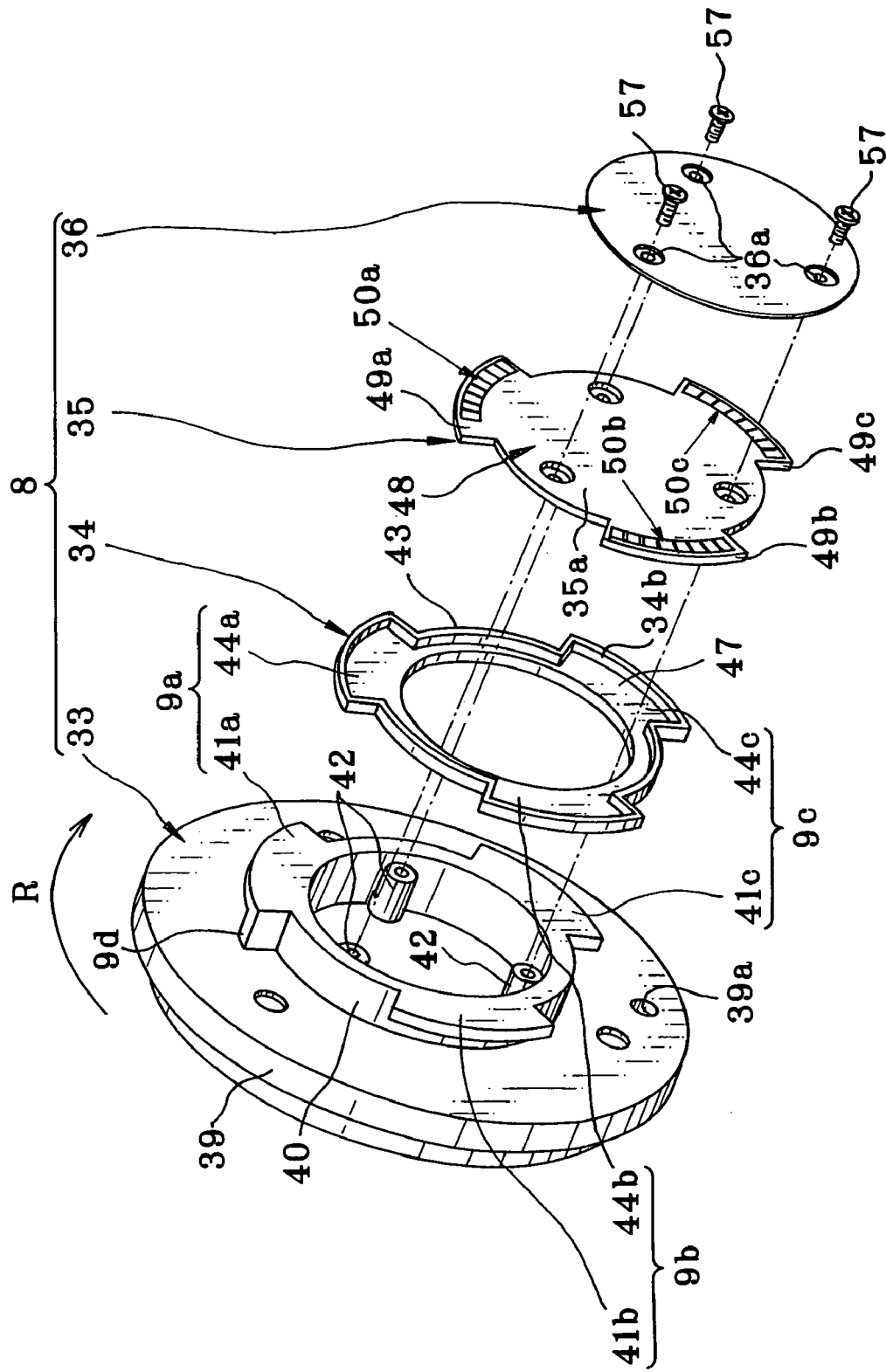
FIG. 4 is an exploded perspective view illustrating a lens unit coupling mechanism.
Figure 5:
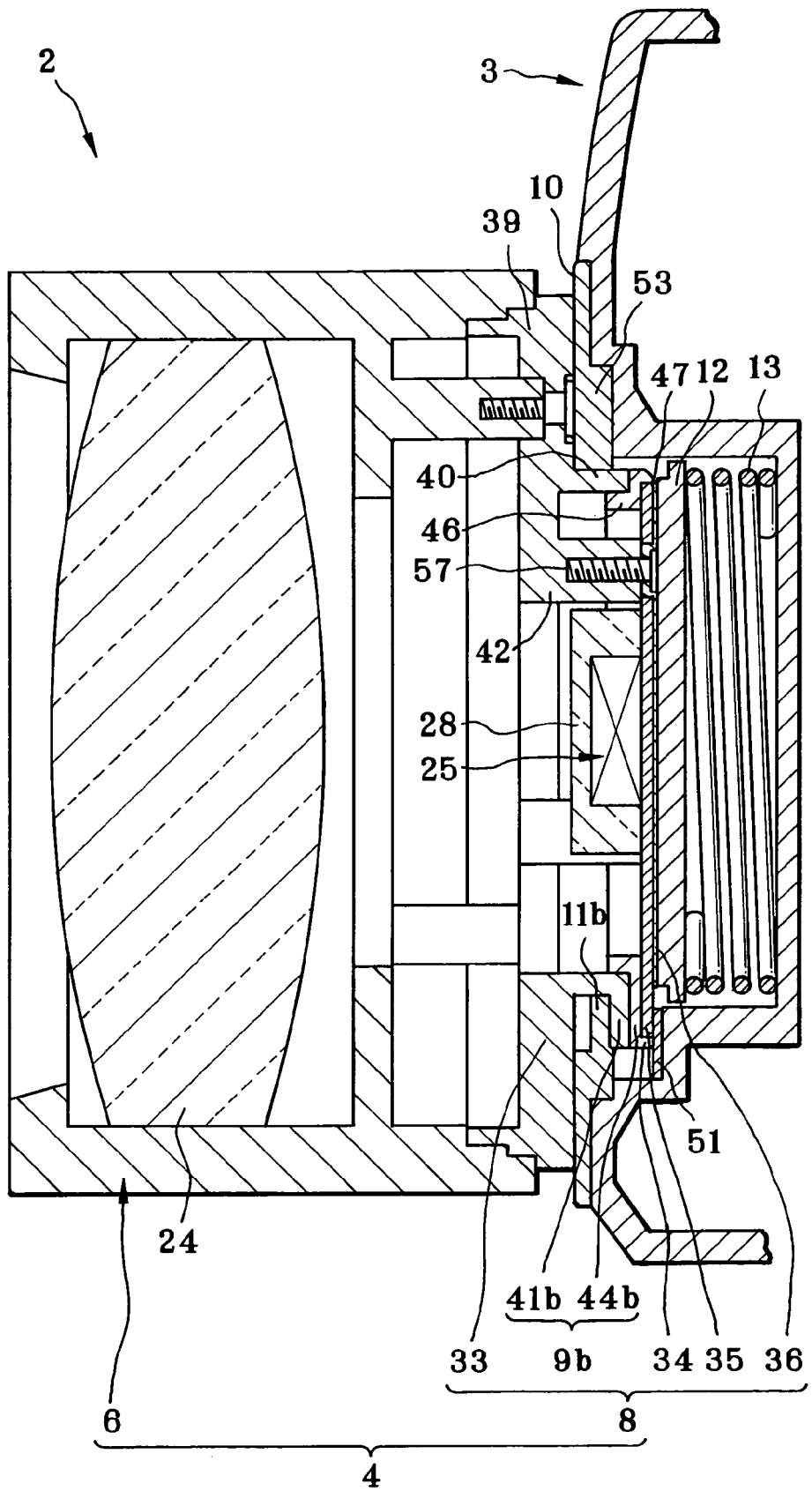
FIG. 5 is a cross section illustrating the digital still camera.

In FIGS. 3, 4 and 5, the lens unit coupling mechanism 8 includes a lens bayonet ring 33, a retention panel 34, a circuit board 35, and an end panel 36. The lens bayonet ring 33 is fastened on the rear end of the lens barrel 6 by such a structure as screws. The lens bayonet ring 33 includes a ring-shaped panel 39, a tube 40, projections 41a, 41b and 41c, and bosses 42. The tube 40 is located concentrically with the ring-shaped panel 39. The projections 41a-41c protrudes from the periphery of the tube 40. For the bosses 42, see FIG. 4. A coupling hole 39a is formed in the ring-shaped panel 39.

In FIG. 4, the retention panel 34 includes a ring portion 43, projections 44a, 44b and 44c, an engageable ring-shaped ridge 46, and a recess 47. The projections 44a-44c protrude from the periphery of the ring portion 43. The ring-shaped ridge 46 of FIG. 3 protrudes from the front of the ring portion 43. The recess 47 is open in the rear. The ring-shaped ridge 46 is inserted in the tube 40 of the lens bayonet ring 33, to combine the retention panel 34 with the lens bayonet ring 33 as a unified manner. The projections 41a-41c of the lens bayonet ring 33 have the same contour as the projections 44a-44c of the retention panel 34, and come to lie over those when the retention panel 34 is fitted on the lens bayonet ring 33. The bayonet lugs 9a-9c are constituted by the projections 41a-41c and also the projections 44a-44c. Note that the bayonet lugs 9a-9c are three in the lens unit coupling mechanism 8. However, the number of the bayonet lugs 9a-9c may be two, or four or more. Also, an anti-dropping ridge 9d is formed at an end of the bayonet lug 9a among the bayonet lugs 9a-9c.

In FIG. 4, the circuit board 35 has a similar shape to that of the retention panel 34 but has a size smaller than the retention panel 34. The circuit board 35 is fitted in the recess 47 of the retention panel 34. The circuit board 35 includes a disk 48 and projections 49a, 49b and 49c formed to protrude from the disk 48. The projections 49a-49c are disposed inside the bayonet lugs 9a-9c. Note that rigidity of the circuit board 35 can be determined in compliance with requirement. The circuit board 35 may be a rigid board, or may be a flexible board having high flexibility.

Lens connection contact blocks or contact groups 50a, 50b and 50c are mounted on a first board surface 35a of the circuit board 35 directed to the rear in the lens unit coupling mechanism 8. See FIGS. 4 and 5. The lens connection contact groups 50a-50c are disposed in the positions of the projections 49a-49c, and are at a regular rotational angle or 120 degrees about the center of the circuit board 35.

Figure 6:
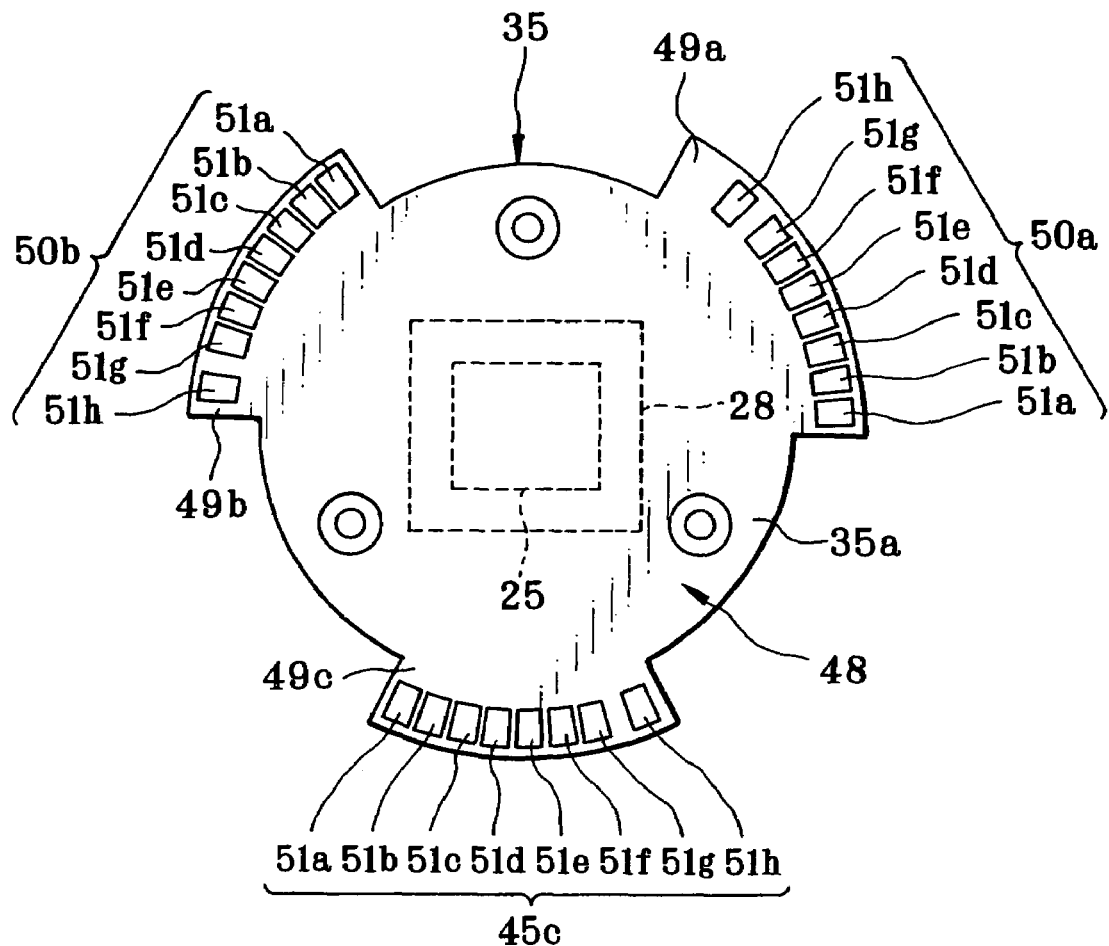
FIG. 6 is a front elevation illustrating a circuit board.

Details of the lens connection contact group 50a are illustrated in FIG. 6. A plurality of, for example, eight (8) lens connection contacts 51a-51h are arranged in the lens connection contact group 50a and in a rotational direction R in one train, the rotational direction being defined by loading of the lens unit 4 on the camera body 3. The lens connection contact groups 50a-50c have an equal structure to one another. Thus, each of the lens connection contact groups 50b and 50c includes the lens connection contacts 51a-51h. Note that 24 contacts are included in the circuit board 35. Eight (8) contacts are included in each of the lens connection contact groups 50a-50c. However, contacts of a sufficient number can be used for the purpose of sufficiently high speed of communication between the lens unit 4 and the camera body 3. A preferable number of contacts included in each of the lens connection contact groups 50a-50c is equal to or more than 15 and equal or less than 30.

The circuit board 35 has a second board surface 35b, which is directed to the middle of the lens unit coupling mechanism 8 and in reverse to the first board surface 35a. The CCD 25 mounted on the circuit board 35 is disposed on the second board surface 35b. Various elements of electric circuits incorporated in the lens unit 4 are mounted on the circuit board 35, including a drive circuit for driving the CCD 25. A transparent cover 28 of resin is secured to a front side of the CCD 25.

The end panel 36 has a small thickness, and a smaller size than the circuit board 35. A plurality of screw holes 36a are formed in the end panel 36. In the lens unit coupling mechanism 8 are squeezed the retention panel 34 and the circuit board 35 between the lens bayonet ring 33 and the end panel 36. Screws 57 for fastening are helically engaged in the screw holes 36a and the bosses 42, and fasten those tightly.

Figure 7:
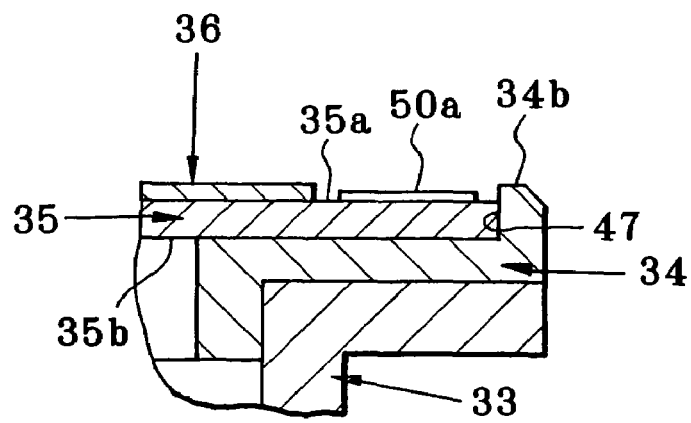
FIG. 7 is a cross section, partially broken, illustrating a contact group.

When the circuit board 35 is secured to the lens bayonet ring 33 together with the end panel 36 and the retention panel 34, the periphery of the lens connection contact group 50a is in the state of FIG. 7. A rear protecting ridge 34b of the retention panel 34 and the end panel 36 project toward the rear over the level of the lens connection contacts 51a-51h. The circuit board 35 is protected by the rear protecting ridge 34b and is free from damages or scratches even when a rear end of the lens unit coupling mechanism 8 receives external mechanical shock.

Figure 8:
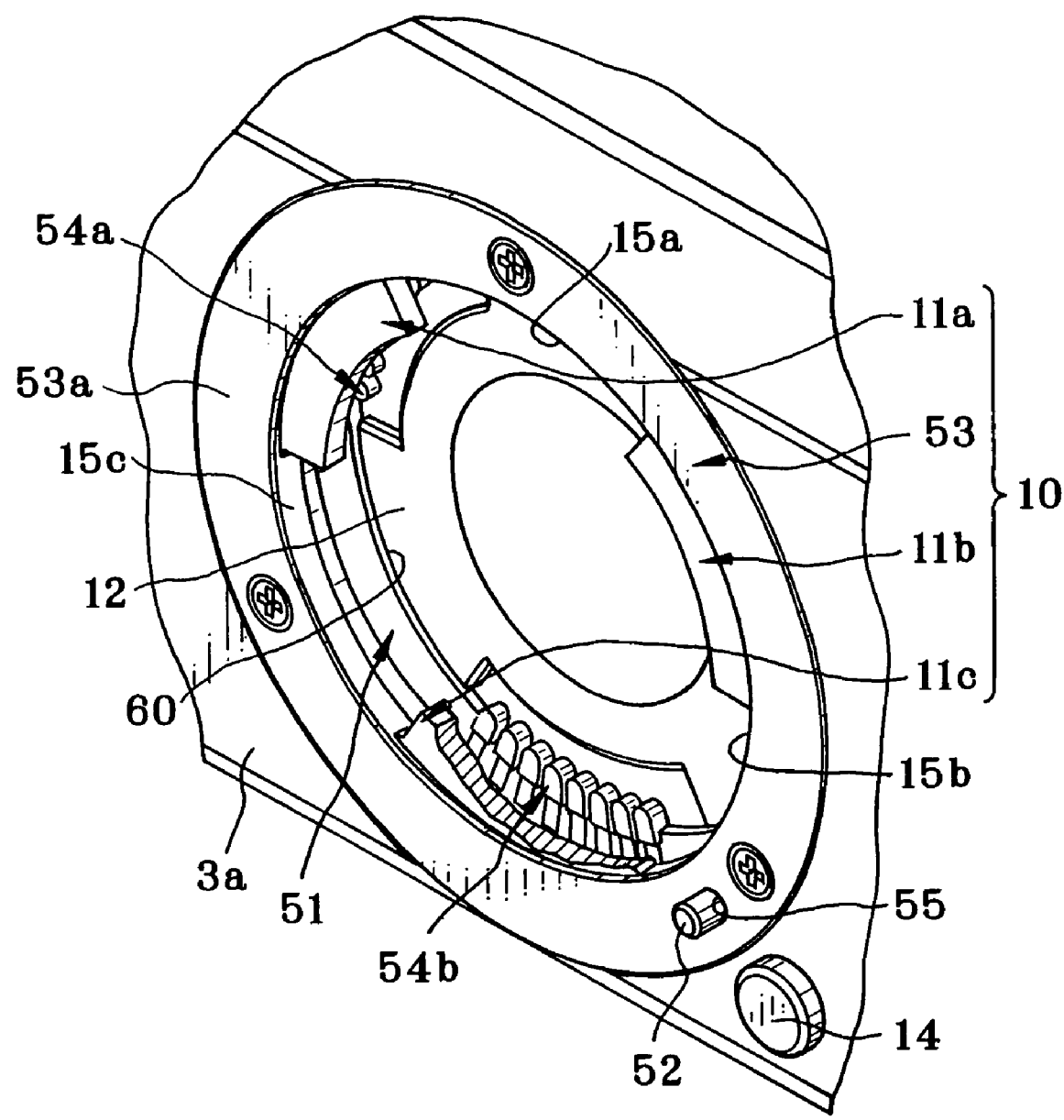
FIG. 8 is a perspective view, partially broken, illustrating a lens mount mechanism.

Details of the structure of the lens mount mechanism 10 are depicted in FIG. 8. A front panel 53 having a receptacle opening is a base of the lens mount mechanism 10, and provided with the bayonet lugs 11a-11c protruding from the same. In FIG. 8, the protecting lid 12 is shown in a form shifted back for the purpose of clarifying the drawing without complexity. In a normal state, the protecting lid 12 is positioned to close the middle opening in the front panel 53, to keep the inside closed. Also, the bayonet lug 11c in the drawing is partially broken for the purpose of illustrating the inside of the lens mount mechanism 10.

The front panel 53 has a ring shape. There is an outer cover 3a of the camera body 3. The front panel 53 is fixedly secured to the outer cover 3a by screws or the like. The bayonet lugs 11a-11c are formed to project from the inner surface of the front panel 53. A connection circuit board 51 is associated with the lens mount mechanism 10 as well as the locking pin or shifter 52. A guide hole 55 is formed in the front panel 53. The locking pin 52 is slidable through the guide hole 55, and biased by a spring (not shown) toward the front.

Retaining channels 15a, 15b and 15c are defined between the bayonet lugs 11a-11c. To load the camera body 3 with the lens unit 4, the bayonet lugs 9a-9c are positioned at and inserted into the retaining channels 15a-15c. A panel surface 53a of the front panel 53 comes to contact the rear surface of the ring-shaped panel 39. The lens unit 4 is rotated counterclockwise in the direction R at a predetermined angle by keeping the contacted state. This engages the bayonet lugs 9a-9c with the bayonet lugs 11a-11c. The locking pin 52 becomes engaged with the coupling hole 39a to load the camera body 3 with the lens unit 4. Note that the anti-dropping ridge 9d receives and regulates the bayonet lug 11a to limit a range where the lens unit 4 is rotatable when the lens unit 4 rotationally reaches an angular position of the predetermined angle.

The connection circuit board 51 is disposed behind the front panel 53. In FIG. 10, a middle opening 60 is formed in the connection circuit board 51 and shaped about the front panel 53. Camera contact groups 54a, 54b and 54c are mounted on the connection circuit board 51 near to the middle opening 60. See FIG. 9. The camera contact groups 54a-54c are positioned in association with the bayonet lugs 11a-11c.

When the lens mount mechanism 10 is viewed from the front side, the camera contact groups 54a-54c are located behind the bayonet lugs 11a-11c in an invisible form.

Each of the camera contact groups 54a-54c includes a plurality of, for example, eight (8) contacts, which are arranged in one train extending in the rotational direction R on the connection circuit board 51. The contacts are disposed in association with the lens connection contacts 51a-51h of the lens unit coupling mechanism 8. While the lens unit 4 is set on the camera body 3, the contacts in the camera contact groups 54a-54a touch the lens connection contacts 51a-51h of the lens connection contact groups 50a-50c.

Figure 9:
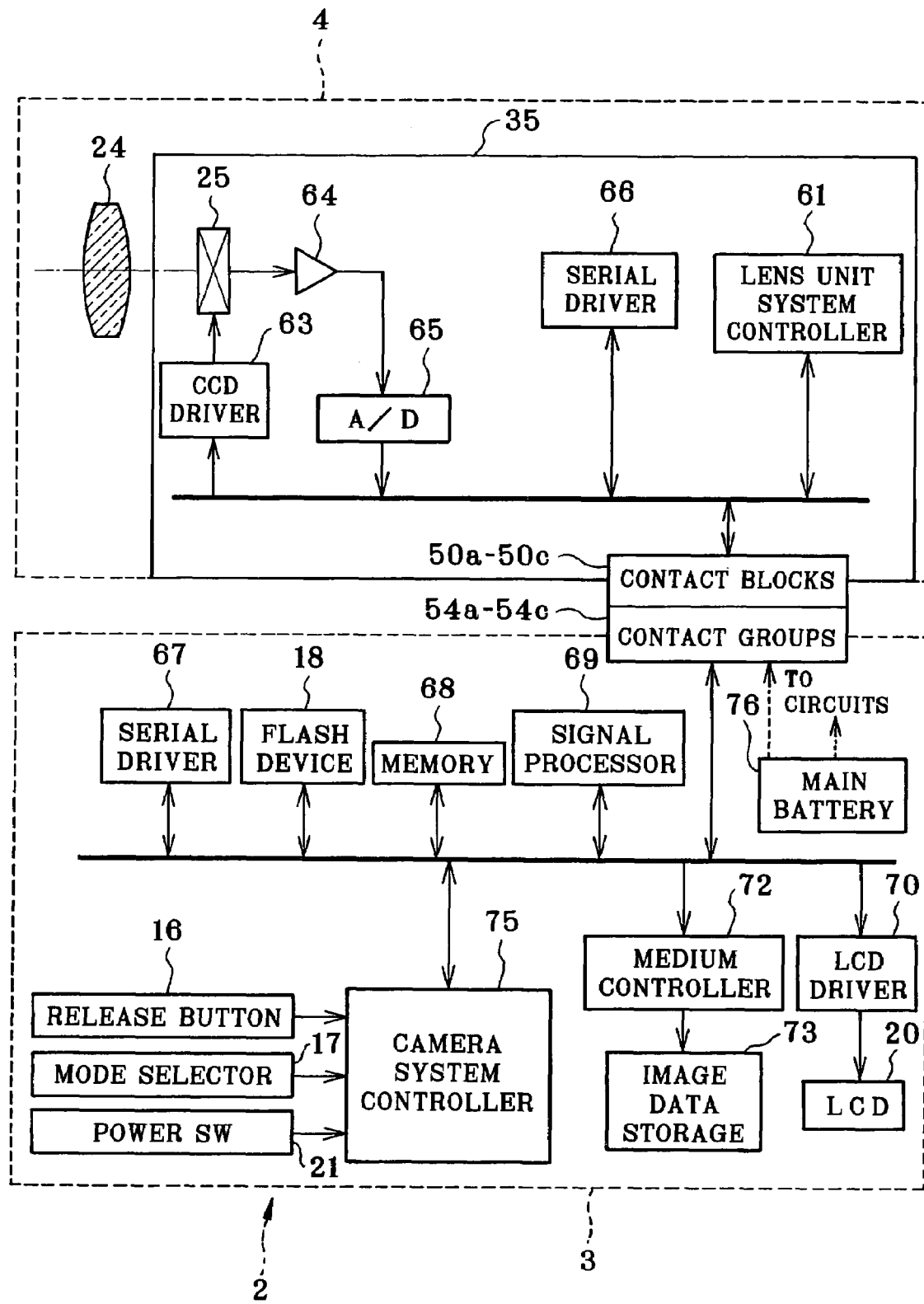
FIG. 9 is a block diagram schematically illustrating arrangement of circuits in the digital still camera.
Figure 10:
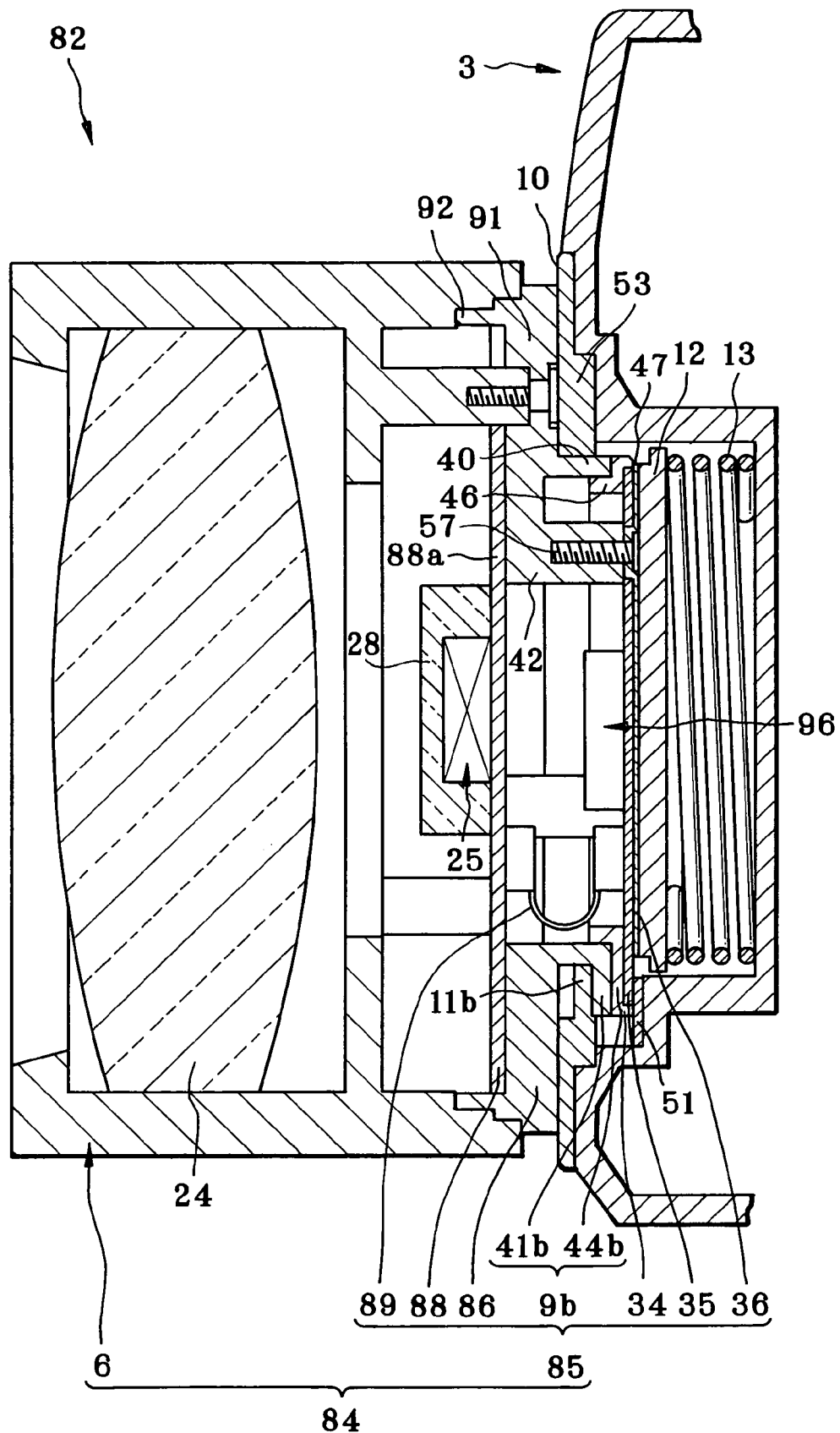
FIG. 10 is a cross section illustrating another preferred digital still camera.

In FIG. 9, the construction of the digital still camera 2 is illustrated. The CCD 25 is disposed behind the photographing lens 24. Elements for photographing, including a shutter mechanism and an aperture stop mechanism (not shown), are disposed in front of the CCD 25.

A CCD driver 63 is connected with the CCD 25. A lens unit system controller 61 controls the CCD driver 63 to drive the CCD 25. The CCD 25 converts light of an object image electrically into an image signal, and outputs the signal. An amplifier 64 amplifies the image signal at a suitable level. An A/D converter 65 converts the amplified signal into image data of a digital form. A serial driver 66 as communication processing circuit is connected to transmit the image data to the camera body 3 by communication. A camera system controller 75 controls the lens unit system controller 61 to manage the image pickup and processing in the lens unit 4.

Among various elements in the lens unit 4 at the circuit board 35, elements mounted on the second board surface 35b are the CCD 25, the lens unit system controller 61, the CCD driver 63, the A/D converter 65 and the serial driver 66. For connection of those to the lens connection contact groups 50a-50c on the first board surface 35a, a circuit pattern is used in the circuit board 35 between the board surfaces 35a and 35b.

A serial driver 67 receives image data from the lens unit 4. A memory 68 is accessed by the serial driver 67 to store the image data by writing. A signal processor 69 reads the image data from the memory 68, and subjects the same to various kinds of processing, such as conversion of gradation, white balance correction, gamma correction and the like. An LCD driver 70 is provided with the image data after the image processing, to cause the image display panel or LCD 20 to display an image. The image on the LCD 20 is a live image. When the mode selector 17 is operated, a playback mode can be set. An image data storage 73 or storage medium can be accessed to read and display a recorded image on the LCD 20. Also, it is possible on the LCD 20 to display the conditions for the image pickup.

A medium controller 72 is responsive to depression of the release button 16, and controls for writing image data to the image data storage 73 in an image processed form after image processing. Also the flash device 18 is driven according to a light amount from the field of photograph, when the release button 16 is depressed. The camera system controller 75 sends command signals to the lens unit system controller 61, and also controls processes of image pickup, image display, and storage of an image in the camera body. Relevant elements are connected to the camera system controller 75, including the release button 16, the mode selector 17 and the power switch 21.

The camera body 3 contains a main battery 76 for supplying various camera elements with power. Also, the main battery 76 is connected to the lens connection contact groups 50a-50c by the camera contact groups 54a-54c to supply elements in the lens unit 4 with power.

The operation is described. In the lens unit coupling mechanism 8 with the circuit board 35, the lens connection contact groups 50a-50c are mounted on the first board surface 35a for connection with the camera body. On the second board surface 35b is mounted the CCD 25 with other elements. Therefore, no connection with flexible wiring boards is required between a circuit board and contacts. The entirety of the connection can be simple with high efficiency in the space. Also, the serial driver 66 is mounted on the circuit board 35 for communication at a high speed. Thus, image data can be sent to the camera body 3 without passage through a flexible wiring boards or the like in the communication. The feature of the invention is effective in a sufficient level of impedance required for high speed commendation in comparison with the use of the flexible wiring boards. It is possible between the lens unit 4 and the camera body 3 to transmit control signals, and also to supply electric power. Furthermore, the rear protecting ridge 34b protects the periphery of the lens connection contact groups 50a-50c, and can be prevented from occurrence of scratches or damages, or deposition of dust. This is effective in preventing a drop in the speed of the communication between the lens unit 4 and the camera body 3 because of the occurrence of damages or dust.

In the above embodiment, the lens unit 4 does not contain a zoom lens mechanism or AF/AE mechanism. However, a lens unit according to the invention may include at least one of a zoom lens mechanism and AF/AE mechanism. To this end, it is possible on the circuit board 35 to mount various relevant circuits, which can be a zoom control circuit, an AF/AE control circuit, an arithmetic operation circuit, and a non-volatile memory, a zoom control circuit controlling a motor for the zoom lens mechanism, the arithmetic operation circuit operating for calculating a object distance or an exposure amount, the non-volatile memory storing required programs and the like. It is possible to economize a space inside the lens unit 4 owing to the simplified construction.

Note that, the single circuit board is provided with most of the electric elements mounted thereon, which include the lens connection contact groups in connection with the camera body 3, and the CCD 25 contained in the lens unit 4. However, it is possible according to the invention to mount the contact groups on a first circuit board and mount the CCD 25 on a second circuit board. Another preferred embodiment is hereinafter described, in which two circuit boards are separate. Elements in FIGS. 10-13 similar to those of the above embodiment are designated with identical reference numerals.

In FIG. 10, a digital still camera 82 includes a lens unit 84 and the camera body 3 loadable with the lens unit 84 in a removable manner. The lens unit 84 is connected electrically with the camera body 3 upon being coupled firmly. A lens unit coupling mechanism 85 for mounting is disposed on the lens unit 84 for connection of its lens barrel 6.

Figure 11:
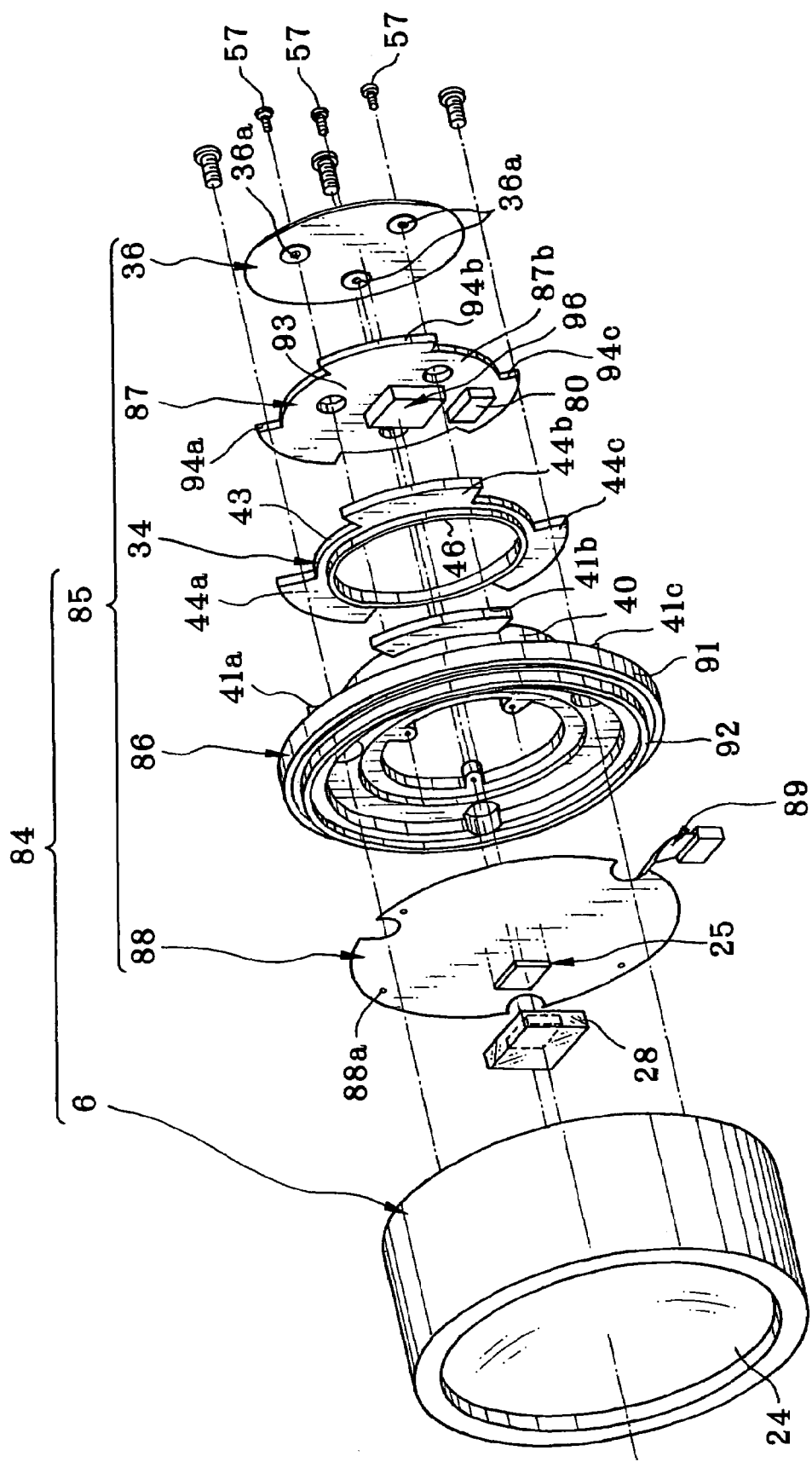
FIG. 11 is an exploded perspective view illustrating a lens unit of the digital still camera of FIG. 10.
Figure 12:
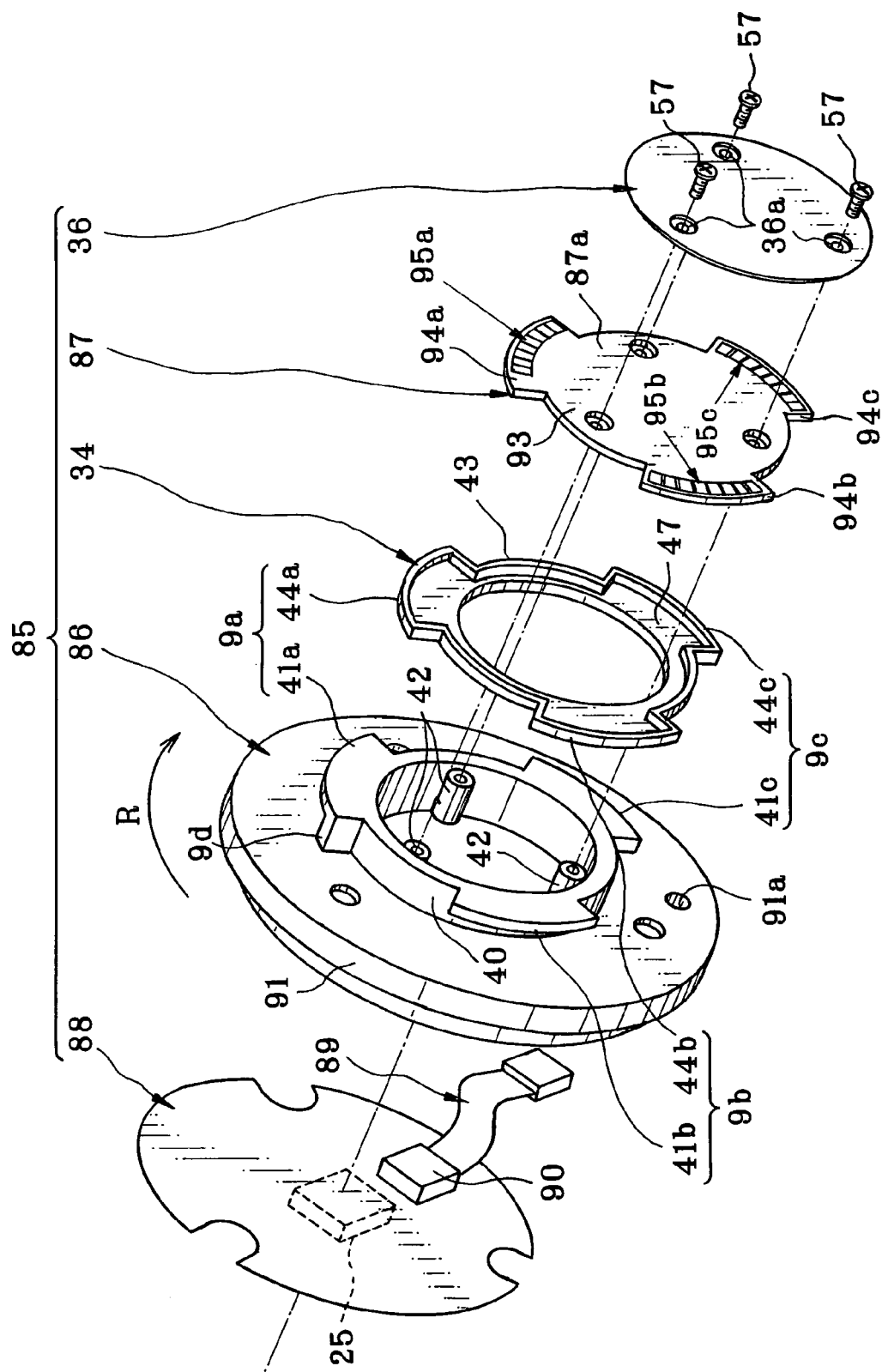
FIG. 12 is an exploded perspective view illustrating a lens unit coupling mechanism.

In FIGS. 11 and 12, the lens unit coupling mechanism 85 includes a lens bayonet ring 86, the retention panel 34, a connection circuit board 87, an image pickup circuit board 88, a connection cable 89 and the end panel 36. The lens bayonet ring 86 is fastened to the rear of the lens barrel 6 by a suitable connection, for example with screws. A ring portion 91 is a portion having the tube 40, the projections 41a-41c and the bosses 42. A coupling hole 91a is formed in the ring portion 91.

A support ring-shaped ridge 92 projects from a front surface of the ring portion 91 of the lens bayonet ring 86. The inside of the support ring-shaped ridge 92 receives the image pickup circuit board 88 fitted therein. A board surface 88a is a front surface of the image pickup circuit board 88, on which the CCD 25 is mounted.

The connection circuit board 87 is fitted in the recess 47 of the retention panel 34 with a contour kept the same as that of the circuit board 35. The connection circuit board 87 includes a disk 93 at the center, and projections 94a, 94b and 94c. The projections 94a-94c are positioned inside the bayonet lugs 9a-9c. A first board surface 87a of the connection circuit board 87 is directed toward the rear in the lens unit coupling mechanism 8. Lens connection contact blocks or contact groups 95a, 95b and 95c are arranged on the first board surface 87a and mounted on the connection circuit board 87. The lens connection contact groups 95a-95c are positioned in associated with the projections 49a-49c, and are disposed at a regular rotational angle or 120 degrees about the center of the circuit board 35. Each of the lens connection contact groups 95a-95c is constituted by the lens connection contacts 51a-51h which are arranged in the rotational direction R in the same manner as the lens connection contact groups 50a-50c.

A second board surface 87b is reverse to the first board surface 87a of the connection circuit board 87, and positioned inwards from the lens unit 84. In FIG. 11, a communication processing IC 96 or circuit for processing of communication is mounted on the second board surface 87b. The communication processing IC 96 includes a circuit of a serial driver or the like for processing in a form of an IC chip.

A connector or terminal 80 is mounted on the connection circuit board 87. A connector or terminal 90 is mounted on the image pickup circuit board 88, and connected electrically with the connector or terminal 80 by the connection cable 89. Image signals obtained by the CCD 25 are transmitted by the connection cable 89, and sent by the communication processing IC 96 on the connection circuit board 87 to the camera body 3.

Figure 13:
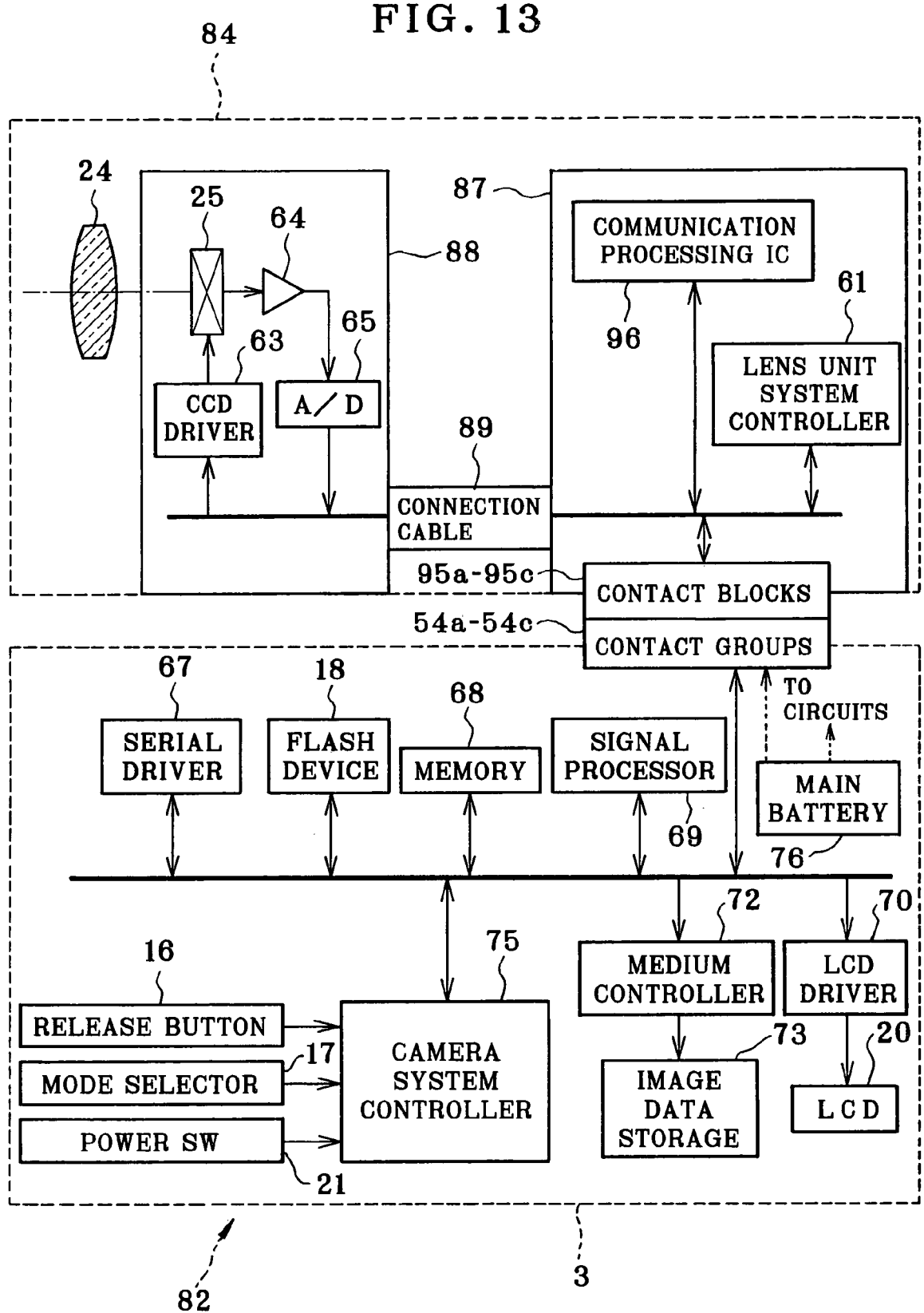
FIG. 13 is a block diagram schematically illustrating arrangement of circuits in the digital still camera.

In FIG. 13, arrangement of the circuits in the digital still camera 2 is illustrated. On the image pickup circuit board 88 are mounted the CCD 25, the CCD driver 63, the A/D converter 65 and the like in relation to the image pickup. On the second board surface 87b of the connection circuit board 87 are mounted the lens unit system controller 61, the communication processing IC 96 and the like, which are connected by a circuit pattern with the lens connection contact groups 95a-95c, which are mounted on the first board surface 87a.

The operation is described. The image pickup circuit board 88 in the lens unit coupling mechanism 8 has the CCD 25 and the CCD drive circuit mounted thereon. On the connection circuit board 87 is mounted the communication processing IC 96. The image pickup circuit board 88 and the connection circuit board 87 are interconnected by the connection cable 89. Therefore, no connection with flexible wiring boards is required between a circuit board and contacts. Only circuit boards are interconnected by a cable which is a simple structure for connection. Also, the IC for processing communication is mounted on the connection circuit board 87 for communication at a high speed. Thus, image data can be sent to the camera body 3 without passage through flexible wiring boards or the like in the communication.

Furthermore, in spite of the above embodiments in which the bayonet lugs are used, it is possible in the invention to interconnect the lens unit and the camera body by female and male connectors. In response to the retention between those; the contacts of the lens unit and the camera body can be interconnected electrically. For use with those, the female and male connectors can be disposed together with two circuit boards, to enable the connection readily between the contacts on the circuit boards. Furthermore, in spite of the above embodiments in which electrical connection between the contacts is used for communication, it is possible in the invention to transmit information by optical communication. To this end, a light source such as an LED for illumination is mounted on a first circuit board. A photo detector such as a photo sensor is mounted on a second circuit board, for detecting light from the light source. The light source and the photo detector can be mounted by a suitable technique of mounting of circuit elements.

In the above embodiment, the camera is the digital still camera. However, a camera of the invention may be a camera distinct from a digital still camera, for example, can be a video camera.

Another preferred embodiment is hereinafter described with reference to FIGS. 14-25, in which a state of a lens unit regarding the loading is automatically detected.

A release button 116 or recording button and a mode selector 117 are disposed on an upper surface of a camera body or camera main unit 103. The release button 116 is depressible for recording an image. The mode selector 117 is operated for setting a selected one of the modes. An electronic flash device 118 and a window of indicator 119 are disposed on a front surface of the camera body 103. A pair of light source LEDs 191a and 191b are located in the indicator 119. See FIGS. 24A and 24B. The LED 191a as loading completion signal generator emits green light. The LED 191b as partial loading signal generator emits orange light. As will be described later, the LEDs 191a and 191b inform one of three states of an interchangeable unit or lens unit 104, which are a completion state after the loading, an incomplete state before the loading, and a state during the loading.

Figure 15:
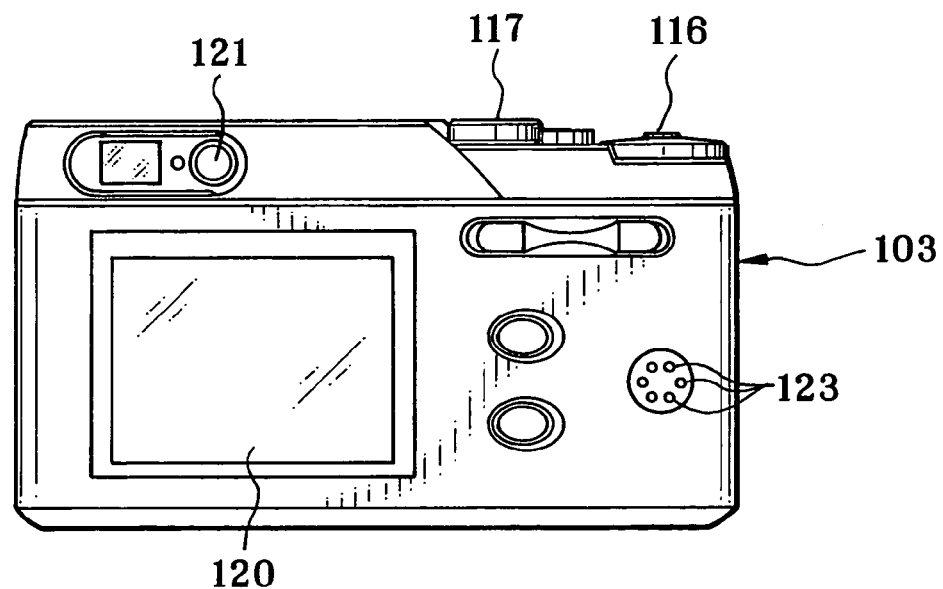
FIG. 15 is a rear elevation illustrating the digital still camera.

In FIG. 15, an image display panel or LCD 120 as partial loading signal generator, and a power switch 121 are disposed on the camera body 103. A sound source 193 of any well-known structure as partial loading signal generator is incorporated in the camera body 103. See FIGS. 24A and 24B. Plural sound holes 123 are formed in the rear of the camera body 103, disposed in front of the sound source 193, for transmitting sound from the sound source 193 to the exterior.

Figure 16:
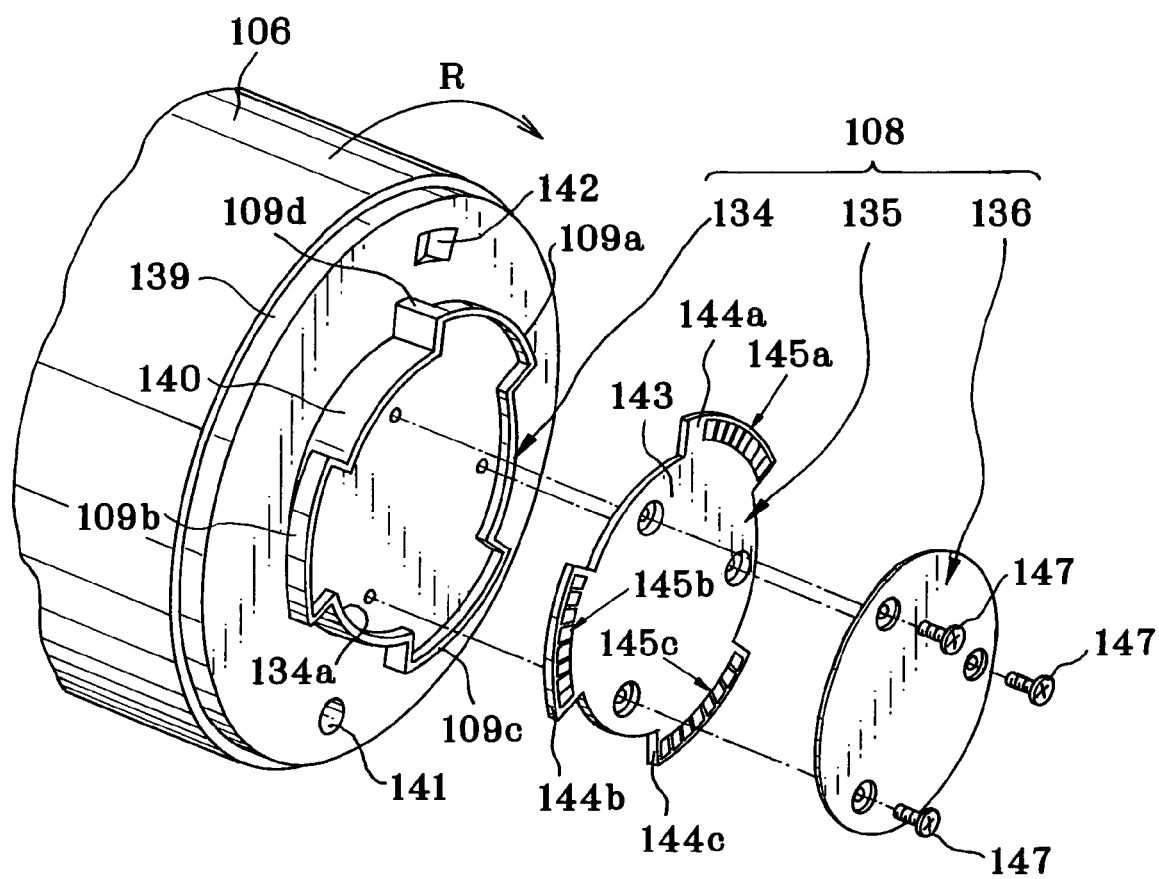
FIG. 16 is an exploded perspective view illustrating a lens unit coupling mechanism.
Figure 17:
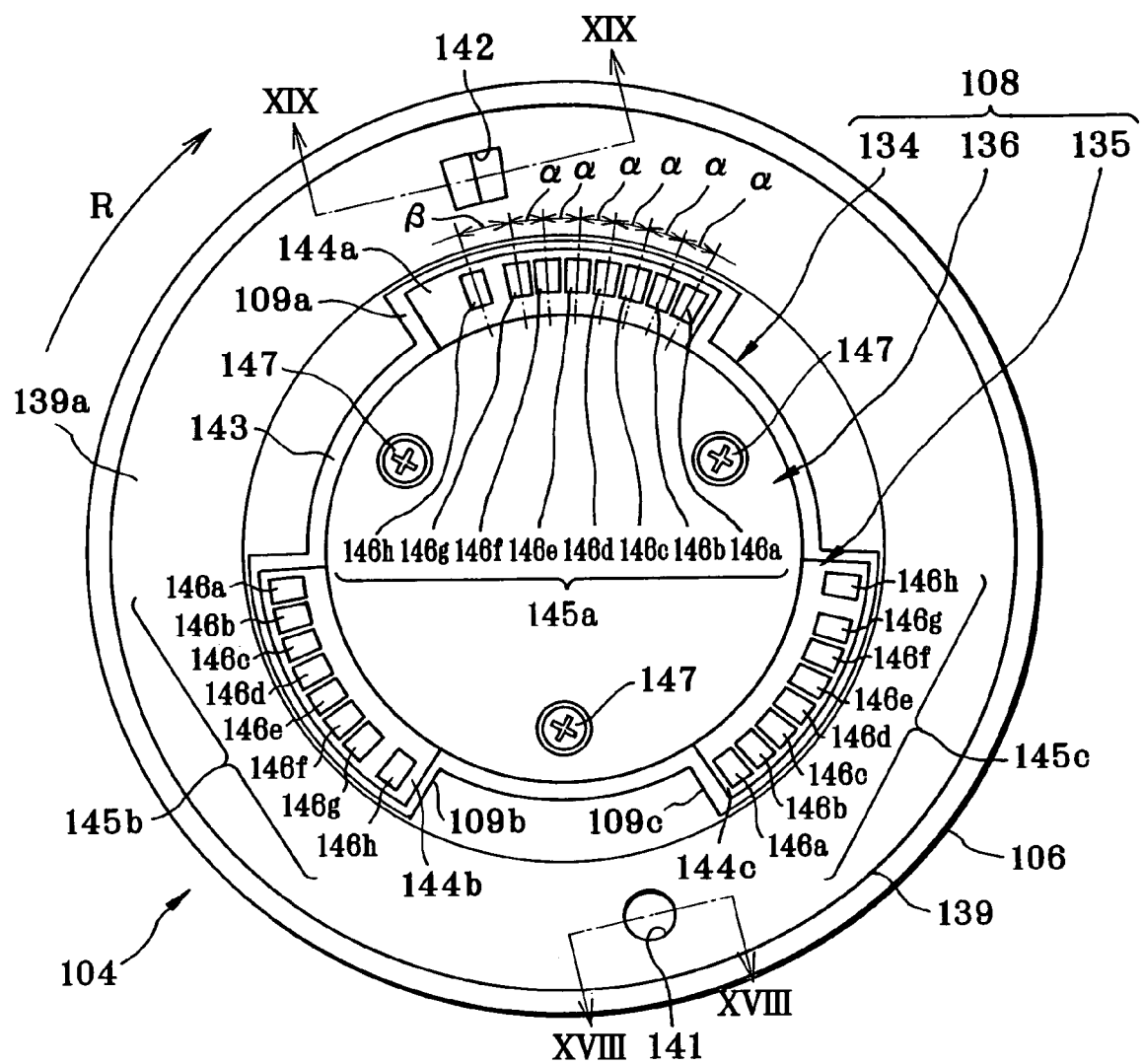
FIG. 17 is a front elevation illustrating the lens unit.

In FIGS. 16 and 17, a lens unit coupling mechanism 108 for mounting is illustrated. A lens bayonet ring 134 as interchangeable unit bayonet ring, a connection circuit board 135 and an end panel 136 are included in the lens unit coupling mechanism 108. A lens barrel 106 has a rear end on which the lens bayonet ring 134 is formed or secured. The lens bayonet ring 134 includes a ring-shaped panel 139, a tube 140, and bayonet lugs 109a, 109b and 109c. The tube 140 is concentric with the ring-shaped panel 139. The bayonet lugs 109a-109c protrude from the tube 140. Note that the bayonet lugs 109a-109c are three in the lens unit coupling mechanism 108. However, the number of the bayonet lugs 109a-109c may be two, or four or more. Also, an anti-dropping ridge 109d is formed at an end of the bayonet lug 109a among the bayonet lugs 109a-109c.

Figure 18:
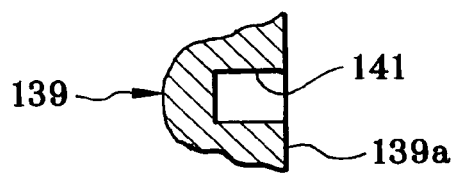
FIG. 18 is a cross section, partially broken, taken on line XXVIII-XXVIII in FIG. 17.
Figure 19:
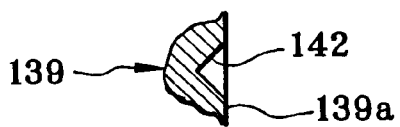
FIG. 19 is a cross section, partially broken, taken on line XIX-XIX in FIG. 17.

A coupling hole 141 and an engageable notch 142 are formed in the ring-shaped panel 139. In FIG. 18, the ring-shaped panel 139 has a panel surface 139a for contact. The coupling hole 141 is formed in a manner cut in the panel surface 139a. A locking pin-shaped shifter 152 with a pinhead to be described later is engageable with the coupling hole 141. In FIG. 19, the notch 142 is viewed in a section. The notch 142 has a shape of a triangle retreating from the panel surface 139a as viewed in a section and in the radial direction that is crosswise to the rotational direction R. An engageable pin-shaped shifter 153 with a pinhead is engageable with the inside of the notch 142.

In FIG. 16, the connection circuit board 135 has a similar shape to that of the lens bayonet ring 134 but has a size smaller than the lens bayonet ring 134. A recess 134a is formed, where the connection circuit board 135 is fitted in the lens bayonet ring 134. The connection circuit board 135 includes a disk 143 and projections 144a, 144b and 144c formed to protrude from the disk 143. The projections 144a-144c are disposed inside the bayonet lugs 109a-109c. Lens connection contact groups 145a, 145b and 145c are mounted on respectively the projections 144a-144c. The lens connection contact groups 145a-145c are disposed at a regular rotational angle or 120 degrees about the center of the connection circuit board 135.

In FIG. 17, details of the lens connection contact group 145a are illustrated. Plural lens connection contacts 146a-146h are included in the lens connection contact group 145a, and arranged in the rotational direction R of rotational shift of the lens unit 104 on the camera body 103. Among the lens connection contacts 146a-146h, the lens connection contacts 146a-146g are arranged at a rotational angle of $\alpha$ regularly from one another. In contrast, the lens connection contact 146h is disposed from the lens connection contact 146g at a rotational angle of $\beta$ that is greater than $\alpha$ ($\alpha<\beta$). The connection circuit board 135 is squeezed between the end panel 136 and the lens bayonet ring 134. Screws 147 are used to fasten those plates including the connection circuit board 135, which is connected with a circuit board for an image pickup device or CCD 125 by a flexible wiring board (not shown) or the like. The lens connection contact groups 145a-145c have a common structure, so each of the lens connection contact groups 145b and 145c includes the lens connection contacts 146a-146h.

Figure 21:
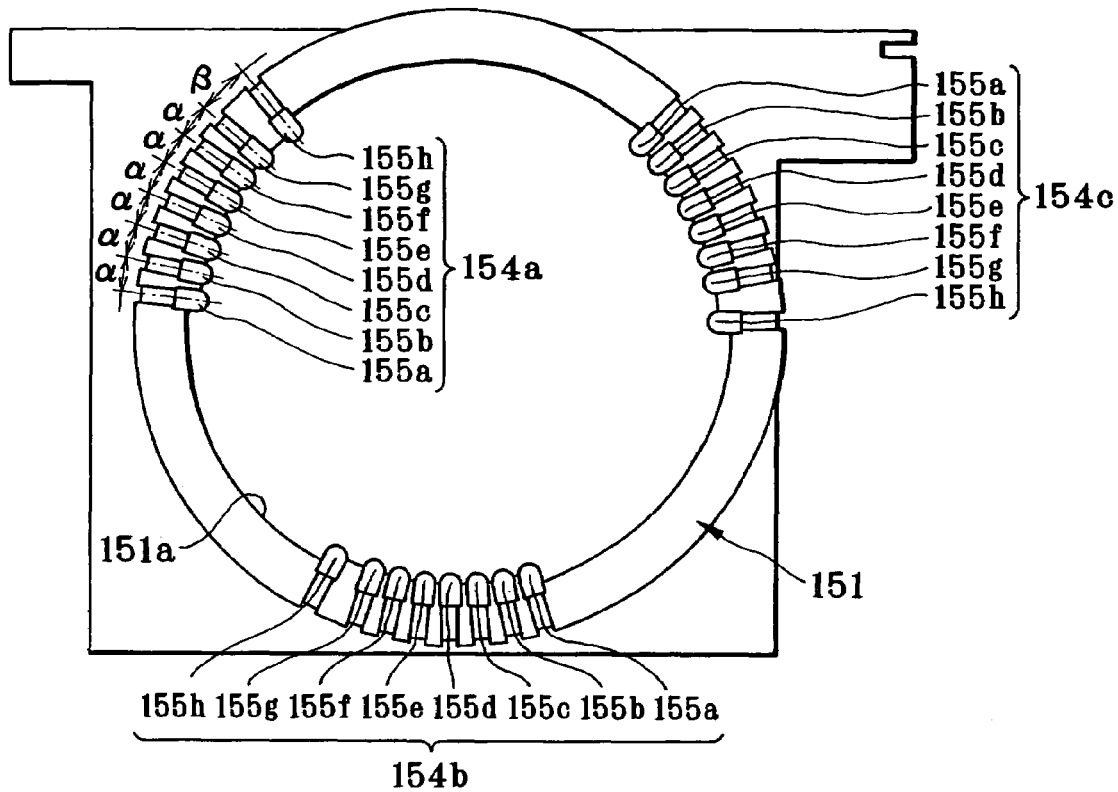
FIG. 21 is a front elevation illustrating a circuit board with contacts.

A connection circuit board 151 is disposed behind a front panel 150 having a receptacle opening. In FIG. 21, a middle opening 151a is formed in the connection circuit board 151 in a form for a lens mount mechanism 110. Camera contact groups 154a, 154b and 154c are mounted on the connection circuit board 151 near the middle opening 151a. There are bayonet lugs 111a, 111b and 111c. The camera contact groups 154a-154c are positioned in association with the bayonet lugs 111a-111c. When the lens mount mechanism 110 is viewed from the front side, the camera contact groups 154a-154c are located behind the bayonet lugs 111a-111c in an invisible form.

Camera contacts 155a-155h are arranged, among which the camera contacts 155a-155g are arranged at a rotational angle of $\alpha$ regularly from one another. In contrast, the camera contact 155h is disposed from the camera contact 155g at a rotational angle of $\beta$ that is greater than $\alpha$ ($\alpha<\beta$). The camera contact groups 154a-154c have a common structure, so each of the camera contact groups 154b and 154c includes the camera contacts 155a-155h which are positioned in association with the lens connection contacts 146a-146h of the lens unit coupling mechanism 108.

Figure 20:
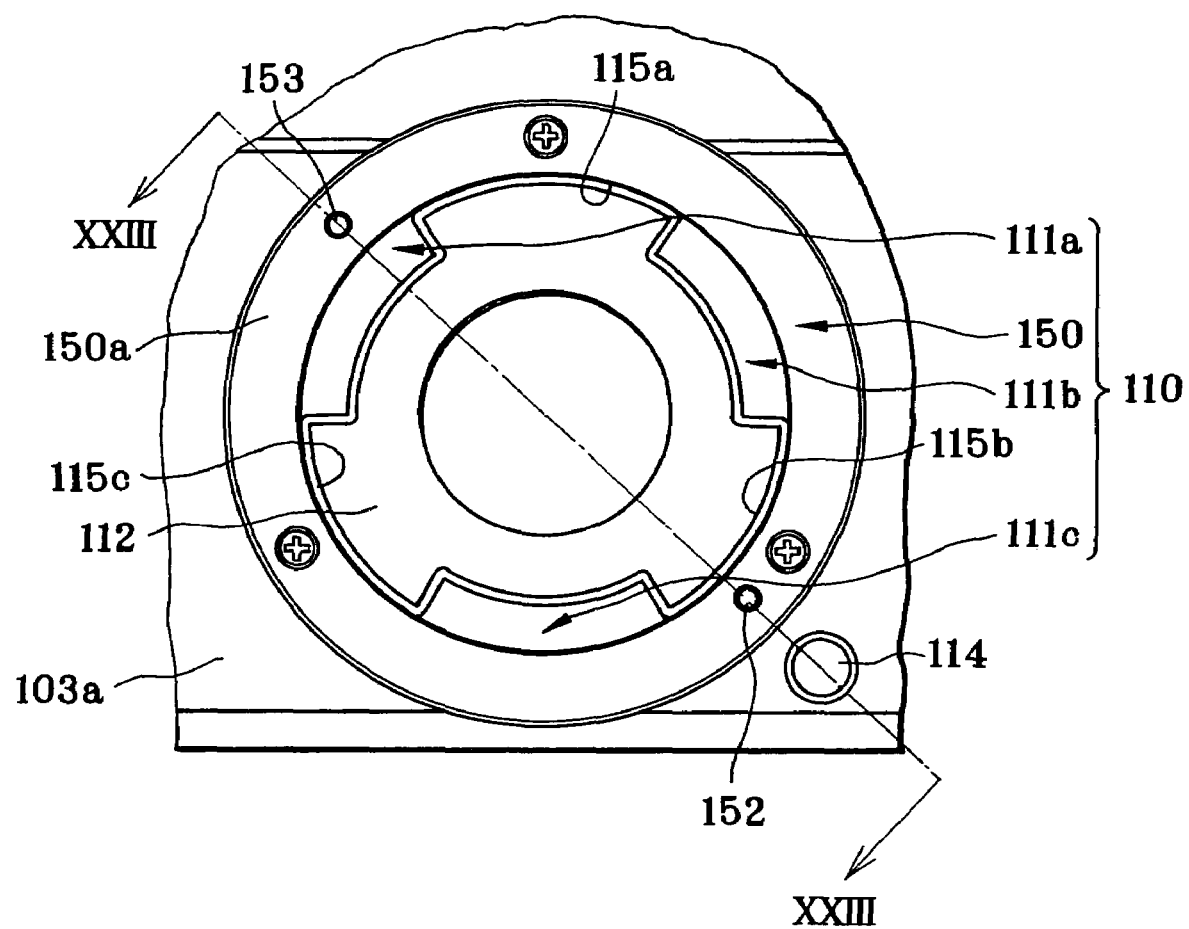
FIG. 20 is a front elevation illustrating a lens mount mechanism.
Figure 22:
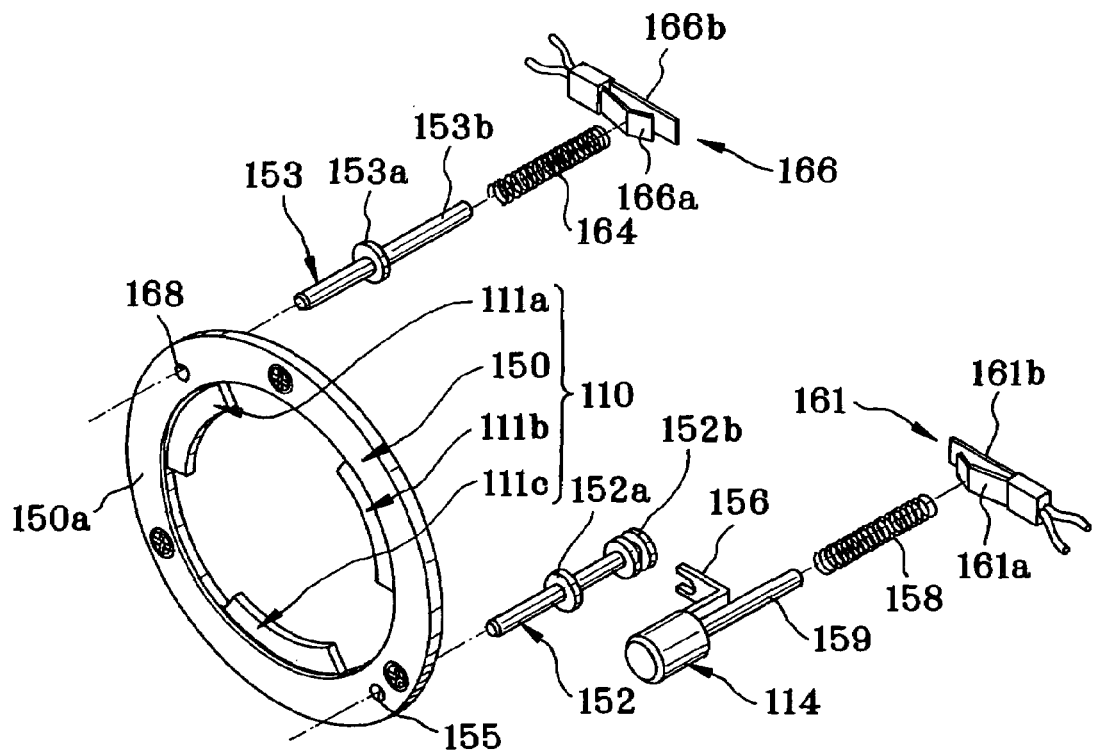
FIG. 22 is an exploded perspective view illustrating the lens mount mechanism.
Figure 23:
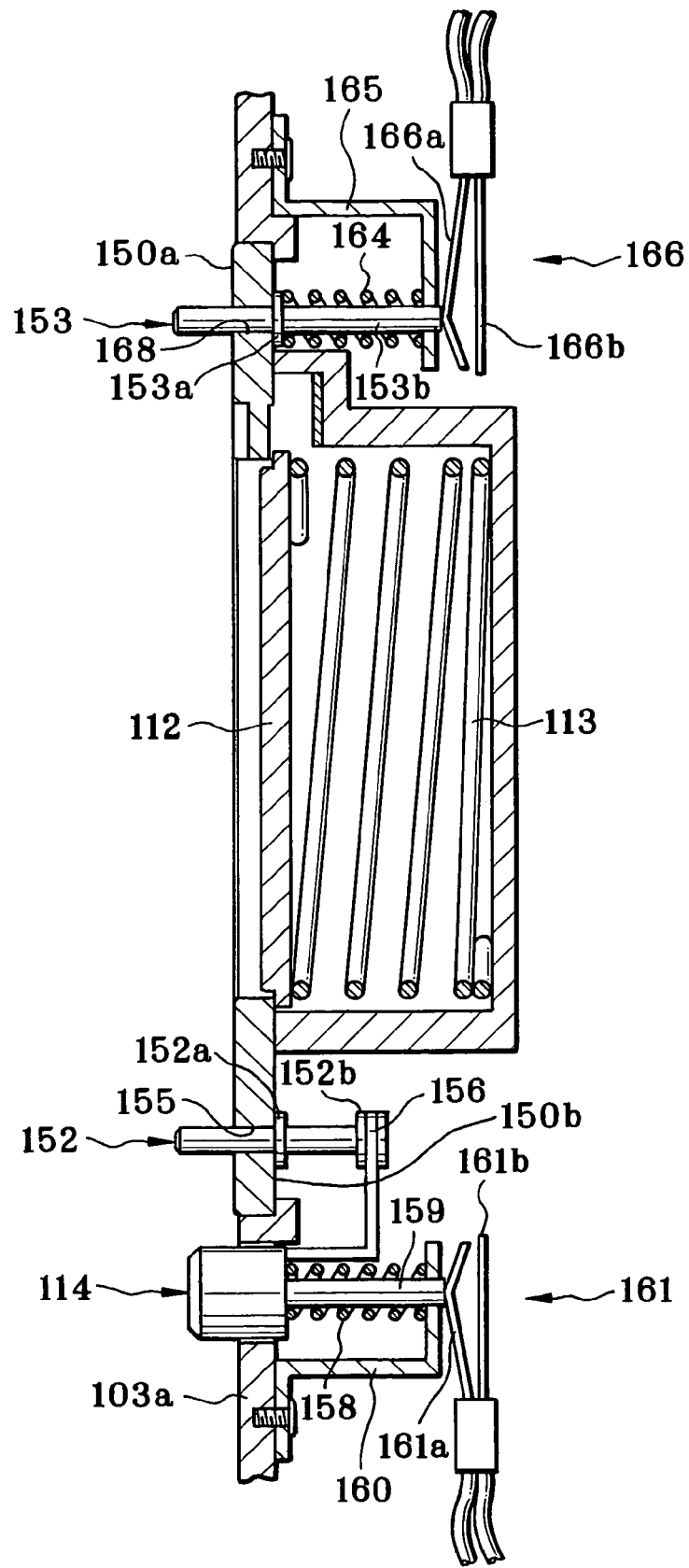
FIG. 23 is a cross section, taken on line XXIII-XXIII in FIG. 20.
Figure 24A:
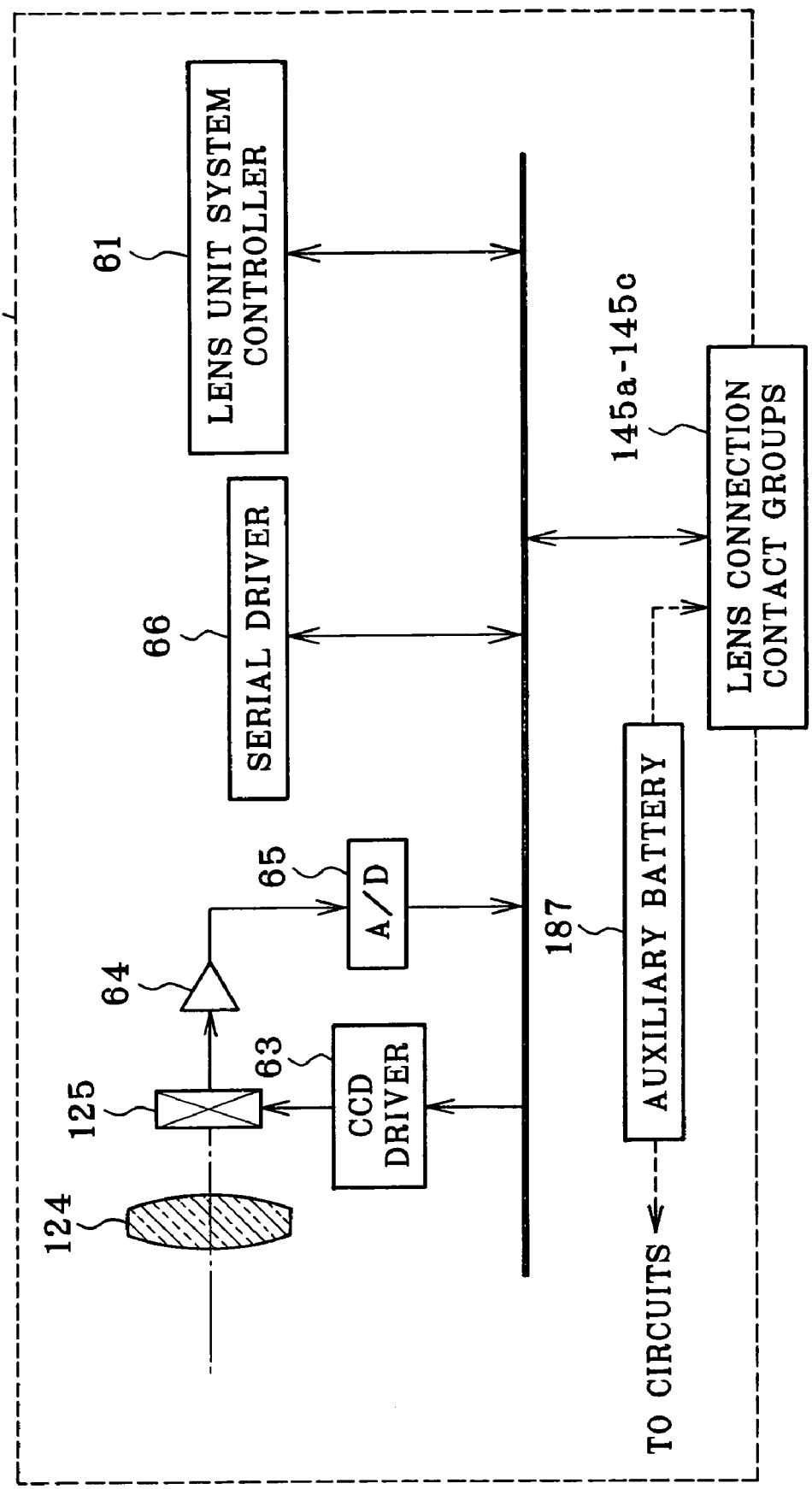
FIG. 24A is a block diagram schematically illustrating arrangement of circuits of the lens unit.

In FIGS. 22 and 23 with FIG. 20, a guide hole 155 is formed in the front panel 150, and keeps the pin-shaped shifter 152 movable in and out. An anti-dropping ridge 152a and a coupling channel 152b are included in the pin-shaped shifter 152. The anti-dropping ridge 152a is movable to contact a panel surface 150b of the front panel 150, and prevents the pin-shaped shifter 152 from dropping away.

On an unlocking button 114, a coupling fork 156 is formed. This keeps the pin-shaped shifter 152 movable back and forth and together with the unlocking button 114. A pressing pin or rod 159 is formed on the rear of the unlocking button 114. A compression coil spring 158 is associated to receive insertion of the pressing rod 159. On an outer cover 103a, a pin support arm 160 is fixedly secured, and supports the pressing rod 159. The unlocking button 114 and the pin-shaped shifter 152 are biased by the compression coil spring 158 in the forward direction. Thus, the pin-shaped shifter 152 protrudes from the front panel 150 forwards. The unlocking button 114 projects from the surface of the outer cover 103a.

A first detector or leaf switch 161 as a start detector is disposed behind the pin support arm 160. Two contacts 161a and 161b of metal constitute the first leaf switch 161, and come to touch each other to turn on the switch.

To load the camera body 103 with the lens unit 104, the ring-shaped panel 139 of the lens unit coupling mechanism 108 is contacted on the front panel 150 of the lens mount mechanism 110. The pin-shaped shifter 152 is pressed by the ring-shaped panel 139, and shifts back into the guide hole 155 against the compression coil spring 158. Upon the shift of the pin-shaped shifter 152, the pressing rod 159 presses the contacts 161a and 161b, which are interconnected to turn on the first leaf switch 161. The lens unit 104 rotates in the rotational direction R while the contact between the ring-shaped panel 139 and the front panel 150 is kept. Accordingly, the coupling hole 141 in the lens unit coupling mechanism 108 moves to the position of the pin-shaped shifter 152. Upon the reach of the coupling hole 141 at the pin-shaped shifter 152, the pin-shaped shifter 152 is caused by the compression coil spring 158 to thrust from the guide hole 155, and becomes engaged with the coupling hole 141. Finally, the lens unit 104 is locked on the camera body 103 and set in a completely loaded state.

A guide hole 168 is formed in the front panel 150, and keeps the engageable pin-shaped shifter 153 movable in and out. An anti-dropping ridge 153a and a pressing pin or rod 153b are included in the pin-shaped shifter 153. The anti-dropping ridge 153a is movable to contact a rear panel surface 150a of the front panel 150, and prevents the pin-shaped shifter 153 from dropping away.

There is a compression coil spring 164 in which the pressing rod 153b of the pin-shaped shifter 153 is inserted. A pin support arm 165 is secured to the camera body 103a and supports the pressing rod 153b. The pin-shaped shifter 153 is pressed forwards by the bias of the compression coil spring 164, and thrust from the front panel 150. A second detector or leaf switch 166 is disposed behind the pin support arm 165. A pair of contacts 166a and 166b of metal constitute the second leaf switch 166, and touch each other to turn on the second leaf switch 166.

To set the lens unit 104 on the camera body, the ring-shaped panel 139 of the lens unit coupling mechanism 108 is first contacted on the front panel 150 of the lens mount mechanism 110. The engageable pin-shaped shifter 153 shifts inside the guide hole 168 in the same manner as the locking pin-shaped shifter 152, to press the contacts 166a and 166b with the pressing rod 153b. The second leaf switch 166 becomes turned on. The lens unit 104 rotates in the rotational direction R during the contact between the ring-shaped panel 139 and the front panel 150. The notch 142 of the lens unit coupling mechanism 108 is shifted to the position of the pin-shaped shifter 153. Upon positioning of the notch 142 at the pin-shaped shifter 153, the pin-shaped shifter 153 is caused by the compression coil spring 164 to protrude from the guide hole 155, and is received by the notch 142. Thus, a finger of a user can be caused to feel a click in loading of the lens unit 104.

A main battery 186 is disposed in the camera body 103 and supplies relevant elements in the camera body 103 with power. Also, an auxiliary battery 187 is contained in the lens unit 104, and connected with the lens barrel 106 in the camera body 103 by the lens connection contact groups 145a-145c and the camera contact groups 154a-154c. The main battery 186 supplies power to the auxiliary battery 187, which in turn supplies elements in the lens unit 104 with power.

A lens mount detector 189 is disposed in the camera body 103 for detecting the lens unit 104 in a manner additional to the leaf switches 161 and 166. The lens mount detector 189 is connected with the camera contact 155*h* in each of the camera contact groups 154*a*-154*c*. When the camera contact groups 154*a*-154*c* in the lens unit 104 shift to contact the lens connection contact groups 145*a*-145*c*, then a camera system controller 185 is provided with information of the loaded state of the lens unit 104 by detecting a potential of the auxiliary battery 187. Note that a state of complete touch or connection of the lens connection contact groups 145*a*-145*c* with the camera contact groups 154*a*-154*c* is obtained when all of the lens connection contacts 146*a*-146*h* in any one of the lens connection contact groups 145*a*-145*c* are connected with the camera contacts 155*a*-155*h* in one of the camera contact groups 154*a*-154*c*. The lens mount detector 189 becomes connected with the lens unit 104 electrically when the lens connection contact 146*b* is connected with the camera contact 155*h* at an end of the course of movement in the rotational direction R. Note that the lens connection contact 146*h* and the camera contact 155*h* are disposed at a second angular interval that is greater than a first angular interval between the lens connection contacts 146*a*-146*g* and the camera contacts 155*a*-155*g*. It is possible to ensure the touch between the lens connection contacts 146*a*-146*g* and the camera contacts 155*a*-155*g* in response to obtaining the connection between the lens connection contact 146*h* and the camera contact 155*h*.

There is an LED driver 192 incorporated in the camera body 103 for controlling illumination of the LEDs 191*a* and 191*b*. The camera body 103 includes not only the sound source 193 but a timer 194 for monitoring, which measures elapsed time for monitoring a loaded state.

In FIG. 23, a compression coil spring 113 is associated with the lens mount mechanism 110. A protecting lid 112 inside the lens mount mechanism 110 is biased by the compression coil spring 113 toward the front, and protects the inside of the camera body 103 from entry of minute dust in the course of removal of a lens unit.

Figure 14:
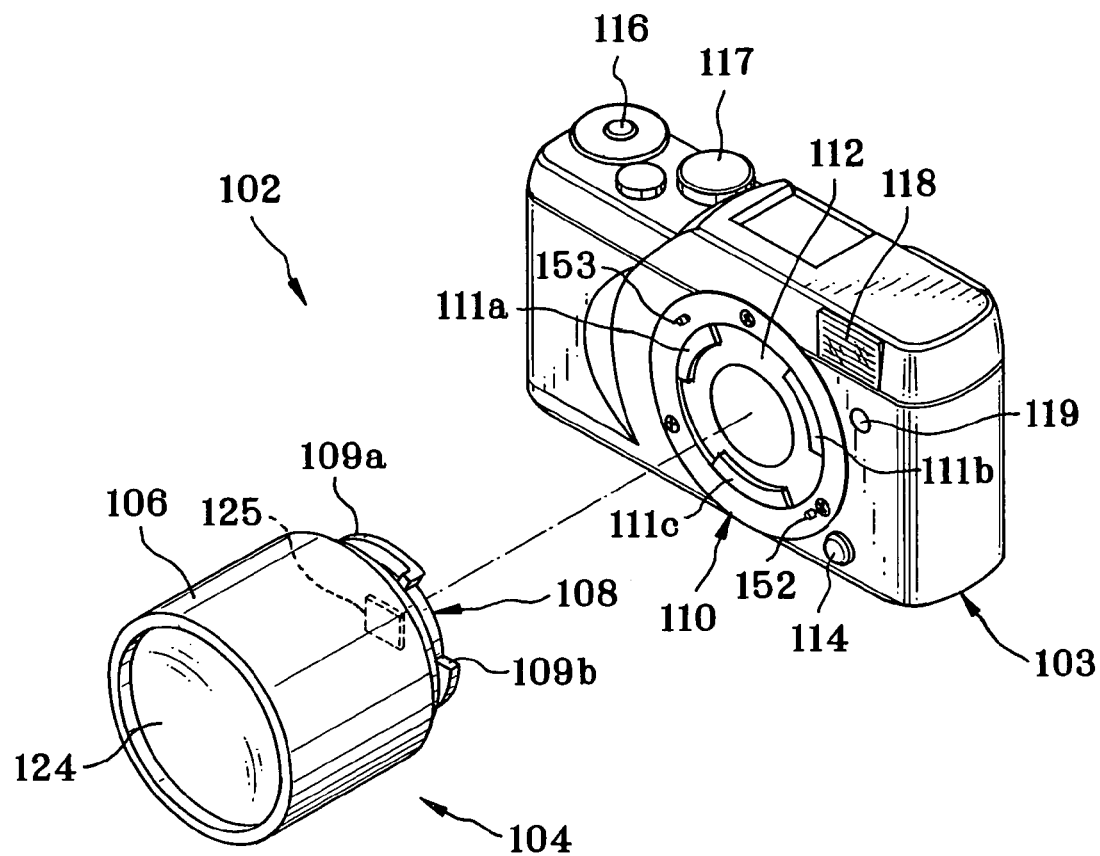
FIG. 14 is a perspective view illustrating another preferred digital still camera from which a lens unit is removed.

In FIG. 14, a lens barrel 106 is provided with the lens unit coupling mechanism 108 in the lens unit 104. There is a photographing lens 124 with the CCD 125 and a circuit board incorporated in the lens barrel 106.

Figure 25:
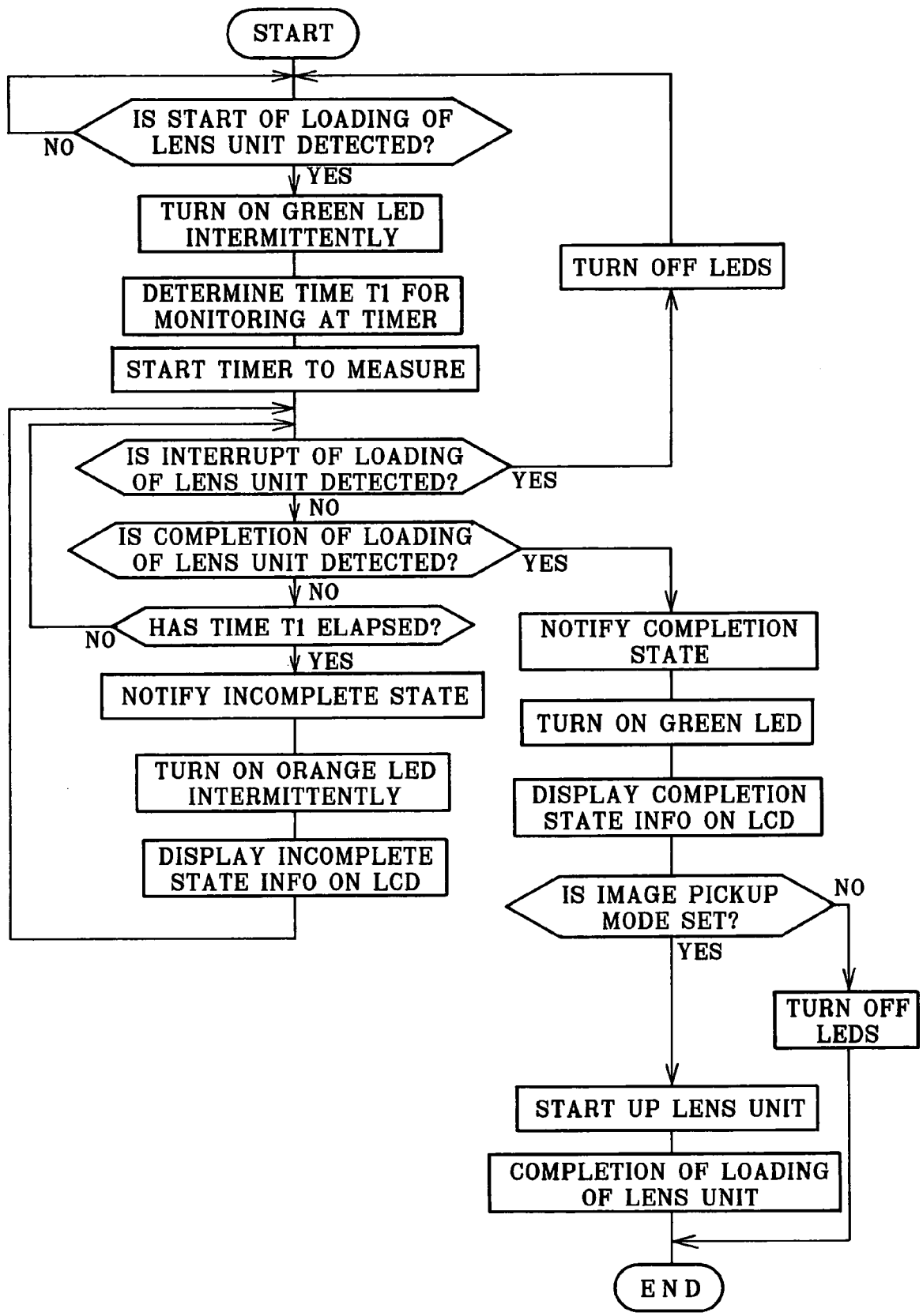
FIG. 25 is a flow chart illustrating a sequence of monitoring loading of the lens unit.

The operation is described by referring to the flow of FIG. 25. To set the lens unit 104 on the camera body 103, at first a user turns on the power supply of the camera body 103. In retaining channels 115*a*, 115*b* and 115*c* of the lens mount mechanism 110, the user inserts the bayonet lugs 109*a*-109*c* by suitably positioning those. The ring-shaped panel 139 contacts the front panel 150. The leaf switches 161 and 166 are turned on. A start of the loading of the lens unit 104 is detected. The camera system controller 185 upon detection of the start causes the LED 191*a* to emit green light intermittently at the indicator 119. Thus, a user can recognize the start of loading of the lens unit 104, namely the state of contact between the lens unit 104 and the camera body 103.

The camera system controller 185, upon detection of the start of the loading of the lens unit 104, starts monitoring of a state of turning on or off of the first leaf switch 161. A memory 178 is accessed to read information of the predetermined time T1 of lapse in the monitoring. The timer 194 is started up, to initiate the measurement of time. The measurement continues until the time comes up to T1 in the monitoring. If both of the leaf switches 161 and 166 become turned off from the turn-on state during the measurement in the timer 194, then the interrupt of loading is detected. Should a user remove the lens unit 104 without fully setting the lens unit 104 and in the incomplete loaded state of the contact, the ring-shaped panel 139 on the lens unit coupling mechanism 108 comes away from the locking pin-shaped shifter 152 and the engageable pin-shaped shifter 153, to turn off both of the leaf switches 161 and 166. In response to the detection of the interrupt of loading, the camera system controller 185 turns off the LED 191*a*, to discontinue the detection of the loaded state of the lens unit 104.

After the start of the loading is detected, only the first leaf switch 161 being turned on becomes turned off during measurement of time in the timer 194. If the second leaf switch 166 remains turned on, then the completion of the loading of the lens unit 104 is detected. The lens unit 104 is caused by a user to rotate counterclockwise on the camera body 103 to reach a predetermined angular position while he or she keeps the coupled state. Then the bayonet lug 111*a* is received and regulated by the anti-dropping ridge 109*d*. The pin-shaped shifter 152 determines a locking state by engagement with the notch 142. As the pin-shaped shifter 152 shifts, the first leaf switch 161 is turned off, to detect the completion of the loading of the lens unit 104. Note that the pin-shaped shifter 153 contacts the disk 143. However, the second leaf switch 166 remains turned on.

The camera system controller 185 checks the timer 194. If the measured time upon the detection of the loading is found within the predetermined time T1, then the camera system controller 185 judges the success in the final loading of the lens unit 104, and generates a signal to inform a user of the loaded state. Plural signaling units can be used in combination. The sound source 193 generates sound, for example alarm sound of a bell. The LED 191*a* is changed over to the continuously illuminating green light from the intermittently illuminating light. Also, the image display panel or LCD 120 is caused to display a message of the loaded state. The camera system controller 185 upon informing the completion of the loading checks a selected mode input at the camera body 103. The lens unit 104 is started up if the selected mode is an image pickup mode, so a digital still camera 102 is set ready for photographing.

In contrast, a situation of no change in the on or off state of the first leaf switch 161, even upon the lapse of the predetermined monitoring time T1 at the timer, is described. In response, an incomplete state of loading of the lens unit 104 is detected. As a user temporarily stops the rotation of the lens unit 104 at an intermediate point which is short of a predetermined angle, the leaf switches 161 and 166 are still kept turned on. There is no detection of completion of the loading of the lens unit 104. Thus, the camera system controller 185 informs the user of the incomplete state of loading of the lens unit 104. To this end, the sound source 193 generates alarm sound, for example, beep sound. Intermittent emission of orange light is started by the LED 191*b* upon stopping intermittent emission of green light at the LED 191*a*. Also, the image display panel or LCD 120 is controlled to display information of a message to notice the incomplete state.

In no matter which direction the camera body 103 is held as viewed from a user, the loaded state can be recognized readily by him or her, because of the combined use of the LEDs 191*a* and 191*b* and the image display panel or LCD 120.

In spite of the above embodiment of the detection after turning on the power of the camera body 103, it is possible in the invention to detect the states even while the power of the camera body 103 remains turned off. At first, the lens unit 104 is loaded while the power of the camera body 103 remains turned off. The leaf switches 161 and 166 are operated to detect the start of the loading. Then the power is changed over and turned on, before the above-described sequence is entered. Any one of the state of the completion of the loading and the incomplete state of the loading is detected to give information. After this, the power can be turned off forcibly by the control of the camera body 103.

In the above embodiment, the detection of the start and completion of the loading of the lens unit 104 is made only by using the leaf switches 161 and 166. However, it is possible in the invention to utilize the lens mount detector 189 for detection of the completion of the loading for the purpose of informing the completion of the loading and/or the incompletely loaded state. For this structure, the start of the loading of the lens unit 104 is detected by the leaf switch 161 or 166 associated with the locking pin-shaped shifter 152. The completion of the loading starts being monitored by the lens mount detector 189 from the state of the start of the loading, namely the coupled state of the lens unit coupling mechanism 108 and the lens mount mechanism 110. When the completion of the loading is detected within the predetermined time T1, then a signal is output to inform the completion of the loading. If the completion of the loading is not detected within the predetermined time T1, the incompletely loaded state is informed. Remaining portions of the sequence are the same as those of the above embodiment.

In spite of the above embodiment, it is possible in the lens unit to incorporate the detector for detecting the start and/or completion of the loading of the lens unit 104, the timer for monitoring by measuring time taken for loading, the information signaling unit for informing the completion or the incomplete state of the loading, and/or the control unit, those elements being contained in the camera body according to the above.

In the above embodiment, the interchangeable unit of the camera is the lens unit 104. However, an interchangeable unit according to the invention may be any one of various accessory devices which are fixedly set on the camera body 103 by a coupling mechanism, and which transmits electric signals by means of contacts on the coupling mechanism. For example, such a unit may be a storage device or writing device for retrieving data stored by the camera body 103, and for writing the data to an internal hard disk. Also, such a unit may be a wireless transmission unit for storing the data in the camera body 103 and also for transmitting the data from the camera body 103 to an external electronic device. Further, such a unit may be an adapter secured between the lens unit 104 and the camera body 103. Of course, a camera of the invention may be a camera distinct from a digital still camera, for example, can be a video camera, and also a camera for a specific use.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera including a lens unit and a camera body, said lens unit having a photographing lens, and an image pickup device for image pickup by detecting object light from said photographing lens, said camera body having a lens mount portion adapted to loading of said lens unit, and a camera contact for electrical connection with said lens unit, said digital camera comprising:

said lens unit having:

a lens unit coupling portion, engageable with said lens mount portion, for removable loading on said camera body;

a lens connection contact for touching said camera contact when said lens mount portion is engaged with said lens unit coupling portion, for electrical connection; and a circuit board, connected with said image pickup device, having a first surface opposed to said camera body, wherein said lens connection contact is mounted on said first surface.

2. A digital camera as defined in claim 1, wherein said circuit board is disposed at a rear end of said lens unit.

3. A digital camera as defined in claim 2, wherein said lens unit coupling portion is engaged with said lens mount portion by bayonet coupling.

4. A digital camera as defined in claim 3, wherein said first surface is directed backwards, and a second surface of said circuit board is directed forwards, and said image pickup device is disposed on said second surface.

5. A digital camera as defined in claim 4, further comprising an image pickup circuit board, provided with said image pickup device mounted thereon, and connected with said circuit board.

6. A digital camera as defined in claim 4, wherein said circuit board includes a communication processor for transmitting information generated by said image pickup device to said camera body.

7. A digital camera as defined in claim 4, wherein said lens connection contact is constituted by plural lens connection contacts, arranged near to one another in a rotational direction of said lens unit coupling portion, and included in a contact block;

said circuit board has a plurality of said contact block.

8. A digital camera as defined in claim 4, wherein said lens unit coupling portion includes a protecting ridge, disposed about a position of said lens connection contact, for protecting said lens connection contact by protruding backwards therefrom.

9. A digital camera as defined in claim 4, wherein said lens mount portion has:

a receptacle opening for receiving insertion of said lens unit coupling portion;

a first bayonet lug mechanism, disposed on an open end of said receptacle opening, for projecting toward a central axis thereof;

wherein said lens unit coupling portion has a second bayonet lug mechanism, disposed to project radially, inserted in a retaining channel defined in a middle of said first bayonet lug mechanism, for rotationally shifting relative to said first bayonet lug mechanism after insertion, to retain said lens unit on said camera body.

10. A digital camera as defined in claim 9, wherein one of said camera contact and said lens connection contact is disposed to project from a retaining channel defined in a middle of said first bayonet lug mechanism;

a remaining one of said camera contact and said lens connection contact is overlaid on a first surface of said second bayonet lug mechanism disposed opposite to said first bayonet lug mechanism.

11. A digital camera as defined in claim 4, wherein said circuit board includes an image pickup device driver for driving said image pickup device.

12. A digital camera as defined in claim 4, wherein said digital camera is a digital still camera.

* * * * *